US012748335B1

(12) United States Patent
Hou et al.

(10) Patent No.: US 12,748,335 B1
(45) Date of Patent: Sep. 29, 2026

(54) DISPLAY ELECTRONIC SLURRY MODULE WITH FRONTLIGHT INTEGRATED INTO COMMON ELECTRODE PLATE

(71) Applicant: Amazon Technologies, Inc., Seattle, WA (US)

(72) Inventors: Weihsin Hou, Fremont, CA (US); Bin Hou, San Jose, CA (US); Xiaolong Zheng, Newark, CA (US)

(73) Assignee: Amazon Technologies, Inc., Seattle, WA (US)

(*) Notice: Subject to any disclaimer, the term of this patent is extended or adjusted under 35 U.S.C. 154(b) by 190 days.

(21) Appl. No.: 18/827,575

(22) Filed: Sep. 6, 2024

Related U.S. Application Data

(60) Provisional application No. 63/538,341, filed on Sep. 14, 2023, provisional application No. 63/536,839, filed on Sep. 6, 2023.

(51) Int. Cl.

| | |
|---|---|
| ***G02F 1/16766*** | (2019.01) |
| ***G02F 1/1333*** | (2006.01) |
| ***G02F 1/167*** | (2019.01) |
| ***G02F 1/1677*** | (2019.01) |
| ***G06F 3/041*** | (2006.01) |

(52) U.S. Cl.
CPC ...... *G02F 1/16766* (2019.01); *G02F 1/13338* (2013.01); *G02F 1/167* (2013.01); *G02F 1/1677* (2019.01); *G06F 3/0412* (2013.01)

(58) Field of Classification Search
CPC ............... G02F 1/16766; G02F 1/1677; G02F 1/13338; G02F 1/167; G06F 3/0412
USPC .......................................................... 359/296
See application file for complete search history.

(56) References Cited

U.S. PATENT DOCUMENTS

| | | | | |
|---|---|---|---|---|
| 7,557,984 B2 * | 7/2009 | Karasawa | G02F 1/167 | 345/107 |
| 7,855,827 B2 * | 12/2010 | Xu | G02B 6/0011 | 359/290 |
| 2008/0084602 A1 * | 4/2008 | Xu | G02B 26/001 | 359/296 |
| 2015/0234430 A1 * | 8/2015 | Gupta | H05K 3/30 | 345/174 |
| 2016/0170250 A1 * | 6/2016 | Ghali | G06F 1/1643 | 29/842 |

OTHER PUBLICATIONS

Hou et al., U.S. Appl. No. 18/827,581, filed Sep. 6, 2024.

* cited by examiner

*Primary Examiner* — Sharrief I Broome
(74) *Attorney, Agent, or Firm* — Kilpatrick Townsend & Stockton LLP

(57) ABSTRACT

A device includes a thin film transistor structure including a plurality of pixel electrodes and a pixelated electronic slurry structure coupled to the thin film transistor structure. The device also includes a common electrode plate including a common electrode electrically coupled to the pixelated electronic slurry structure and a touch sensor module coupled to the common electrode plate.

20 Claims, 13 Drawing Sheets

DISPLAY ELECTRONIC SLURRY MODULE WITH FRONTLIGHT INTEGRATED INTO COMMON ELECTRODE PLATE

CROSS-REFERENCE TO RELATED APPLICATIONS

This application claims the benefit of and priority to U.S. Provisional Application No. 63/536,839, filed Sep. 6, 2023, and entitled "INTEGRATION OF FL FUNCTIONS TO DES MODULE BY USING THE COMMON ELECTRODE PLANE AS A LIGHTGUIDE PLATE," and U.S. Provisional Application No. 63/538,341, filed Sep. 14, 2023, and entitled "A FULL DISPLAY STACK DESIGN BASED ON DES MODULE HAVING INTEGRATED TOUCH AND FRONTLIGHT FUNCTIONS TO REDUCE THE DISPLAY INTERLAYERS," the contents of which are hereby incorporated by reference in their entirety for all purposes.

BACKGROUND

Electrophoretic panels can be used in different types of devices. For example, an e-reader device can include an electrophoretic display panel. The electrophoretic display panel supports good readability in bright ambient light, such as in the sunlight. The electrophoretic display panel also supports low power consumption. As such, the e-reader device can be battery powered and used for different applications including displaying static contents (e.g., e-books) and dynamic content (e.g., animations).

DETAILED DESCRIPTION

Figure 1:
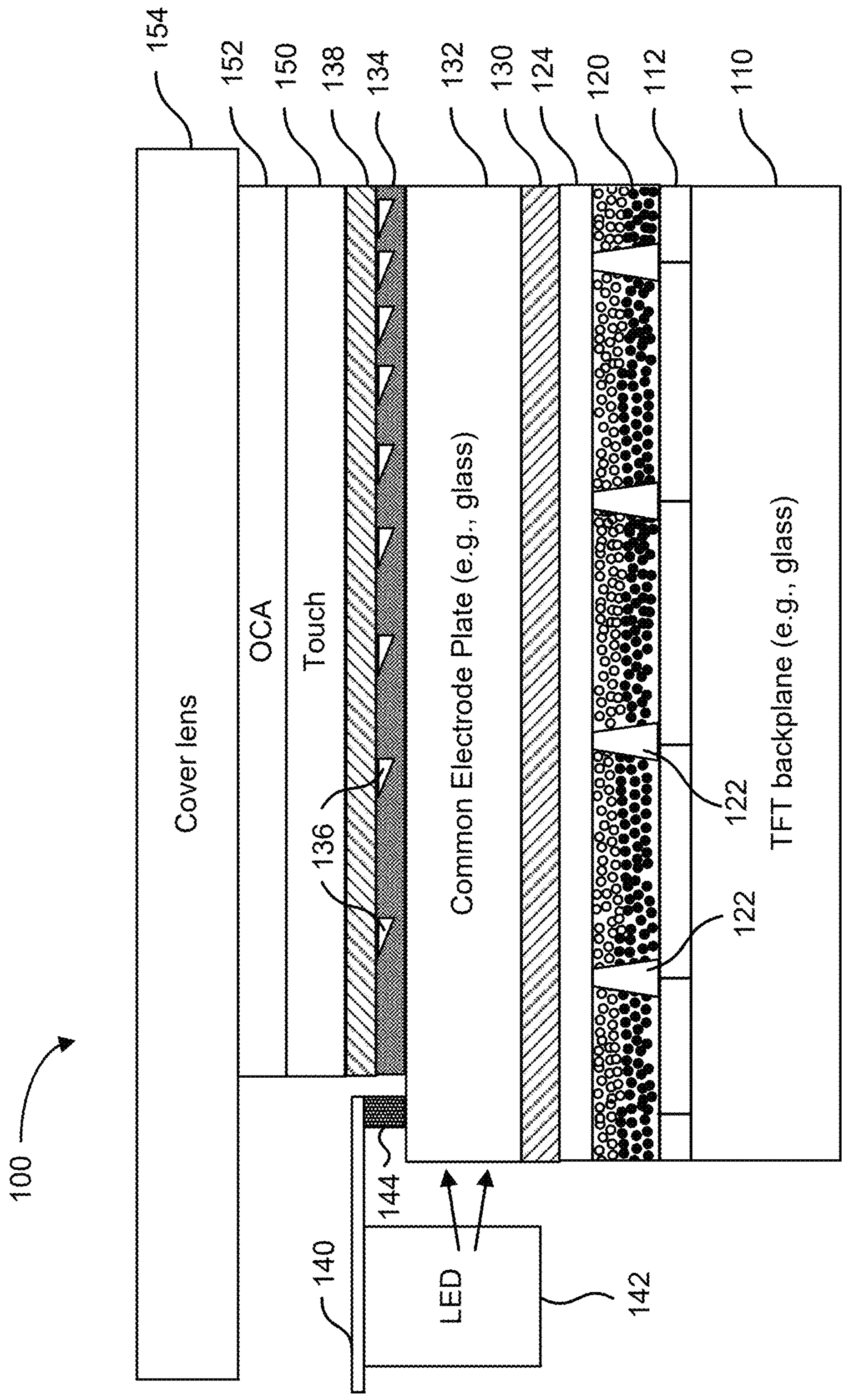
FIG. 1 is a simplified schematic diagram illustrating a display module with an integrated frontlight according to an embodiment of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Current displays, including electrophoretic displays and display electronic slurry modules, utilized in both non-color and color displays, utilize separate frontlight units to illuminate the pixels of the display. As an example, in some systems, a discrete frontlight unit is laminated on top of a display module, e.g., an electrophoretic display, using an optically clear adhesive. Thus, the size and weight of the display is adversely impacted. Also, there are more interfaces between the frontlight and the display, which will generate more interlayer reflection, therefore reducing the optical properties, such as contrast ratio reduction.

As described more fully below, embodiments of the present disclosure utilize the common electrode plate of a display electronic slurry module as a lightguide plate. As a result, the display electronic slurry module implements a frontlight function, obviating the use of a separate and discrete frontlight module attached to display electronic slurry module. The common electrode plate, on which the common electrode of display unit is deposited, is utilized as the lightguide plate. The common electrode plate, also referred to as an optical layer herein, can be fabricated using glass or clear plastic with an index of refraction in the range of n~1.47-1.5. Low index of refraction coatings, (e.g., a coating with an index of refraction lower than glass or clear plastic, for example, on the order of $n \leq 1.45$) can be formed on the user side of the common electrode plate, the side of the common electrode plate opposing the user side, or both sides of the common electrode plate to produce total internal reflection at the coating/plate interface and enable the light coupled into the common electrode plate to propagate in the common electrode plate. As an example, low index of refraction coating(s) can be deposited by either chemical vapor deposition (CVD), sputtering, spin, slot-die, gravure, dispensing, stencil coating processes, or the like.

In other embodiments, an optically clear adhesive (OCA), also referred to as an optical adhesive, can be utilized in conjunction with or in place of a low index of refraction coating on the user side surface of the common electrode plate in order to provide an index of refraction difference and support light propagation. Light extraction features can be added on either the user side or the side of the common electrode glass plate opposing the user side as described more fully herein. In order to integrate frontlight functionality, a light source, for example, a light emitting diode (LED), can be mounted adjacent an edge of the common electrode plate in order to couple light into the common electrode plate. Drive electronics for the light source can be bonded to the top side of the common electrode plate outside the viewing area in the form of an LED flexible printed circuit (FPC) as discussed more fully herein. Thus, embodiments of the present disclosure provide a full display stack design utilizing an integrated frontlight suitable for use with a display electronic slurry module.

Figure 3:
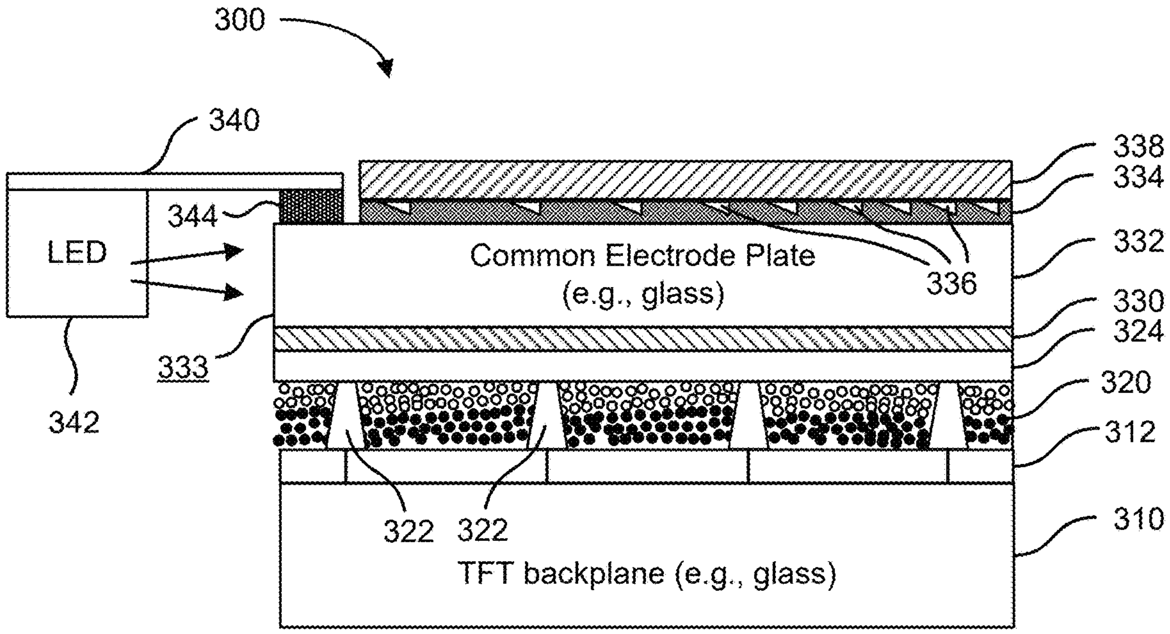
FIG. 3 is a simplified schematic diagram illustrating a display electronic slurry module including a common electrode plate lightguide according to an embodiment of the present disclosure.

FIG. 1 is a simplified schematic diagram illustrating a display module with an integrated frontlight according to an embodiment of the present disclosure. Referring to FIGS. 1 and 3, the display module with an integrated frontlight 100 shown in FIG. 1 includes the display electronic slurry module including a common electrode plate lightguide 300 shown in FIG. 3 combined with a touch sensor module 150, an OCA 152, and a cover lens 154. Additional description related to the display module with an integrated frontlight 300 is provided in relation to FIG. 3.

As illustrated in FIG. 1, the TFT backplane 110 and the pixel electrodes 112 are illustrated. The common electrode 124 is formed, along with a first coating 130, on the optical layer 132. The first coating 130 can be in contact with the optical layer 132 and the common electrode 124 can be in contact with the first coating 130. The ink slurry 120 is separated by the photo spacers 122 and sandwiched between the common electrode 124 of the optical layer 132 and the pixel electrodes 112 of the TFT backplane 110. Additionally, the light source 142 is mounted on the FPC 140, which is bonded to the optical layer 132 or the second optical layer 134 using adhesive 144. The index of refraction of the second optical layer 134 can be equal or similar to the index of refraction of the optical layer 132. In some embodiments, the second optical layer 134 is characterized by an index of refraction greater than the index of refraction of the optical layer 132. A second coating 138 is coupled to the second optical layer 134 and the optical scattering structure 136. The second coating 138 can have an index of refraction lower than the index of refraction of the second optical layer 134. The optical scattering structure 136 can be disposed in the optical layer 132. The optical scattering structure 136 can include a refractive structure. The display module with an integrated frontlight 100 can further include an optical adhesive coupled to the optical scattering structure 136 and the optical layer 132.

Figure 2:
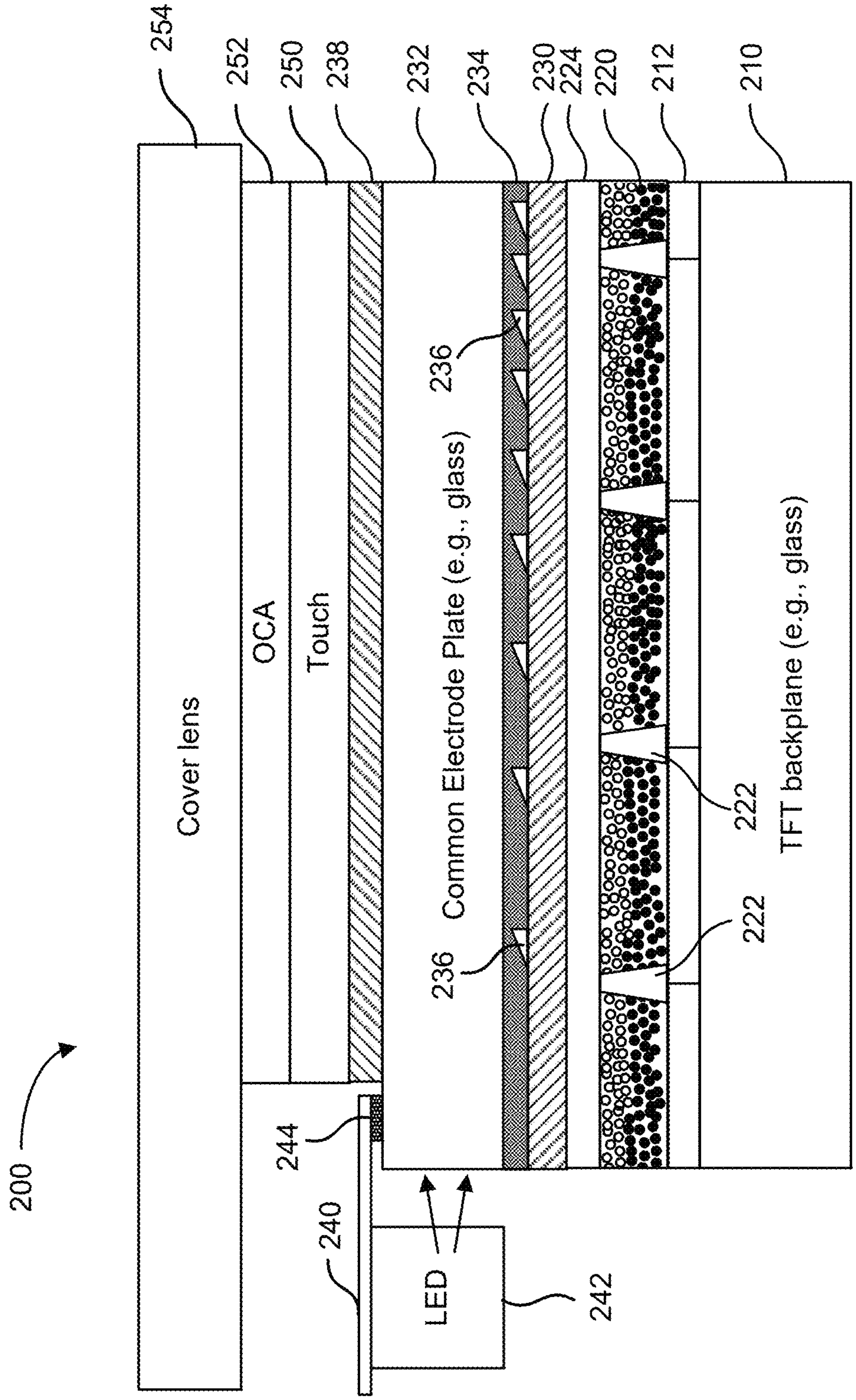
FIG. 2 is a simplified schematic diagram illustrating a display module with an integrated frontlight according to another embodiment of the present disclosure.
Figure 4:
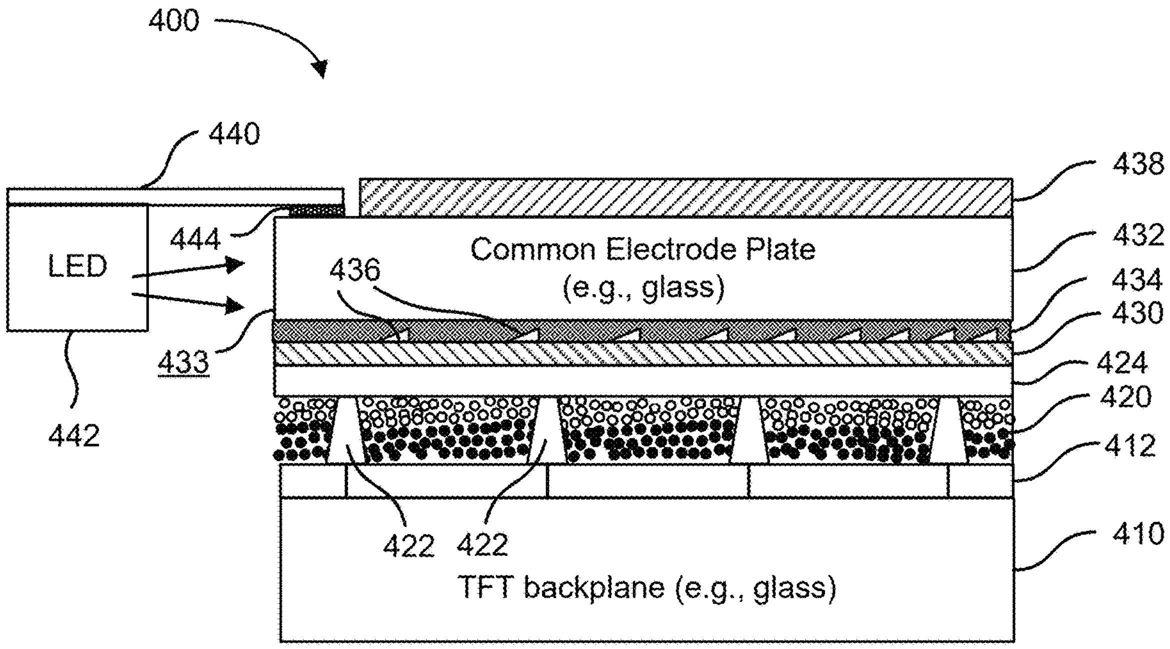
FIG. 4 is a simplified schematic diagram illustrating a display electronic slurry module including a common electrode plate lightguide according to another embodiment of the present disclosure.

FIG. 2 is a simplified schematic diagram illustrating a display module with an integrated frontlight according to another embodiment of the present disclosure. Referring to FIGS. 2 and 4, the display module with an integrated frontlight 200 shown in FIG. 2 includes the display electronic slurry module including a common electrode plate lightguide 400 shown in FIG. 4 combined with a touch sensor module 250, an OCA 252, and a cover lens 254. Additional description related to the display module with an integrated frontlight 400 is provided in relation to FIG. 4.

As illustrated in FIG. 2, the TFT backplane 210 and the pixel electrodes 212 used to drive the display are illustrated. The common electrode 224 is formed, along with the first coating 230 on the optical layer 232. The ink slurry 220 is separated by the photo spacers 222 and sandwiched between the common electrode 224 of the optical layer 232 and the pixel electrodes 212 of the TFT backplane 210. The light source 242 is mounted on a FPC 240, which is bonded to the optical layer 232 using adhesive 244. The optical scattering structure 236 are embedded in the second optical layer 234. The second coating 238 is coupled to the optical layer 232. The second optical layer 234 can have an index of refraction equal to or similar to the optical layer 232. The index refraction of the first coating 230 can be less than the second optical layer 234. The index of refraction of the second coating 238 can be less than the index of refraction of the optical layer 232.

FIG. 3 is a simplified schematic diagram illustrating a display electronic slurry module including a common electrode plate lightguide 300 according to an embodiment of the present disclosure. Referring to FIG. 3, a thin film transistor (TFT) backplane 310, typically fabricated using a glass substrate, supports the pixel electrodes 312 used to drive the display. The TFT backplane 310 can also be referred to as a TFT structure.

The common electrode 324 is formed, along with a first coating 330 (e.g., a low index of refraction coating) on an optical layer 332, illustrated in FIG. 3 as the common electrode plate and fabricated in this embodiment using a glass plate. The common electrode 324 is in electrical communication with the pixel electrodes of the TFT backplane 310, i.e., the TFT structure, and is suitable for control of the TFT backplane. The common electrode plate, also referred to as an optical layer 332, is as an optical layer since this layer supports both light propagation and the common electrode corresponding to the pixel electrodes 312 supported on the TFT backplane 310. The first coating 330 has an index of refraction that is lower than the index of refraction of the optical layer 332. For instance, if the optical layer 332 is fabricated from glass with an index of refraction of n=1.5, then the first coating 330 will generally have an index of refraction in the range of n=1.4. As will be evident to one of skill in the art, the lower index of refraction provided by the first coating 330 results in total internal reflection for light propagating in the optical layer 332. In some implementations, the first coating 330 is fabricated by depositing a silicon coating or the like. A variety of coating techniques can be utilized, including CVD and/or other deposition processes. The first coating 330 can also be a polymeric coating with a low refractive index component disposed therein. A variety of coating techniques can be utilized to deposit the first coating 330, e.g., a polymeric coating, on the optical layer 332, for example, by spin coating, slot-die coating, stencil coating or any other similar type of coating technique. In some implementations, the common electrode 324 is a transparent conductive material such as indium tin oxide, silver nanowires, a metal mesh, polymer ink, graphene, or the like. In these implementations, the first coating 330 can be fabricated using a deposition process to form the first coating 330 in such a manner than the formation of the common electrode 324 at elevated temperatures will not adversely impact the optical performance or reliability of the first coating 330. Thus, in the illustrated embodiment, the first coating is deposited on and in physical contact with the optical layer and the common electrode is deposited on and in physical contact with the first coating.

The ink slurry 320 is separated by photo spacers 322 and sandwiched between the common electrode 324 of the optical layer 332 and the pixel electrodes 312 of the TFT backplane 310. The ink slurry 320 in conjunction with the photo spacers 322 define pixels that correspond to the pixel electrodes 312 of the TFT backplane 310. The ink slurry, also referred to as a pixelated electronic slurry structure, is disposed between the TFT backplane and the common electrode 324.

In order to generate illumination light for the display, a light source 342 is mounted on a FPC 340. The FPC 340 is bonded to the optical layer 332 or the second optical layer 334 using adhesive 344. Light emitted by the light source 342, for example, an LED, propagates toward the edge 333 of the optical layer 332 and is coupled into the optical layer 332 by edge coupling before propagation and total internal reflection in the optical layer 332. The edge 333 of the optical layer 332 can be coated with an antireflection coating and/or the space between the light source 342 and the edge 333 of the optical layer 332 can be filled with an encapsulant in order to prevent intrusion of water or other substances into the space between the light source 342 and the edge 333 of the optical layer 332. Thus, the LED can emit light in a plane passing through the edge 333 of the optical layer 332, which is a horizontal plane in the embodiment illustrated in FIG. 3. Thus, in an embodiment, the optical layer 332 comprises an edge and the light source 342 comprises a light emitting diode configured to emit light in a plane passing through the edge of the optical layer.

Referring once again to FIG. 3, an optical scattering structure 336, also referred to as a set of light extraction features, is also optically coupled to the optical layer 332. In the embodiment illustrated in FIG. 3, the optical scattering structure 336 is disposed or embedded in a second optical layer 334 that has an index of refraction greater than or equal to the index of refraction of the optical layer 332. When the second optical layer 334 has an index of refraction that is equal to the index of refraction of the optical layer 332, the second optical layer 334 is index matched and negligible reflection occurs at the interface between the optical layer 332 and the second optical layer 334. The optical scattering structure 336 can be a diffractive structure that is characterized by a varying diffraction efficiency as a function of distance from the light source. In other embodiments, the optical scattering structure can include a refractive structure.

In embodiments in which the optical layer 332 is glass, with an index of refraction of n=1.5, the second optical layer 334 can have an index of refraction n≥1.5. A second coating 338 is coupled to the second optical layer 334 and the optical scattering structure 336. The second coating 338, which can be a silicon-based OCA with an index of refraction of ~n=1.4, has an index of refraction that is lower than the index of refraction of the optical layer 332 and second layer 334. The second coating 338 can be laminated or formed using a liquid coating process. As will be evident to one of skill in the art, the lower index of refraction provided by the second coating 338 results in total internal reflection for light propagating in the optical layer 332. In some embodiments, the optical scattering structure 336 includes voids, e.g., filled with air or other gas, in order to provide an index of refraction difference with respect to the second optical layer 334. In other embodiments, the optical scattering structure 336 includes features filled with the material used to fabricate the second coating 338. The optical scattering structure 336 thus form a diffractive structure similar to a diffraction grating that diffracts light propagating in the optical layer 332 toward the ink slurry 320 adjacent the pixel electrodes 312 of the TFT backplane 310. In some embodiments, the second layer 334 is a layer of photoresist that is patterned to form the optical scattering structure 336.

As illustrated in FIG. 3, the diffraction efficiency of the optical scattering structure 336 varies as a function of the distance from the light source 342 in order to improve the uniformity of the display output. The periodicity of the features of the optical scattering structure 336 increases as a function of the distance from the light source 342 in the embodiment illustrated in FIG. 3, but other techniques can be utilized to implement varying diffraction efficiency, including varying grating teeth height, or the like. One of ordinary skill in the art would recognize many variations, modifications, and alternatives.

Although the optical scattering structure 336 includes diffractive structures in the embodiment illustrated in FIG. 3, this is not required and, in other embodiments, refractive structures can be utilized as appropriate to the particular application.

Thus, referring to FIG. 3, the first coating 330 and the second coating 338, with an index of refraction that is lower than the index of refraction of the optical layer 332, produces total internal reflection at the interface of the first coating 330 and the optical layer 332 for light propagating in the optical layer 332. Additionally, the optical scattering structure 336 embedded in the second optical layer 334 produce diffraction of light propagating in the optical layer 332 that illuminates the ink slurry 320 for display purposes. Moreover, the second coating 338, which also has an index of refraction that is lower than the index of refraction of the optical layer 332 and second coating 338, produces total internal reflection at the interface of the second coating 338 and, as a result, total internal reflection for light propagating in the optical layer 332. As a result, the optical structure shown in FIG. 3 implements a lightguide functionality that is characterized by both waveguiding by total internal reflection at at least one interface and outcoupling produced by the optical scattering structure 336. Thus, the common electrode plate serves not only as the substrate on which the common electrode is supported, but also as a lightguide that enables frontlight functionality to be implemented in the display electronic slurry module. Pixelated light emitted by the display is viewed by a user located above the display in the embodiment illustrated in FIG. 3. Thus, the surface of the optical layer 332 adjacent the second optical layer 334 can be referred to as a user side surface.

FIG. 4 is a simplified schematic diagram illustrating a display electronic slurry module including a common electrode plate lightguide according to another embodiment of the present disclosure. The display electronic slurry module including a common electrode plate lightguide 400 illustrated in FIG. 4 shares common elements with the display electronic slurry module including a common electrode plate lightguide 300 illustrated in FIG. 3 and the discussion provided in relation to the display electronic slurry module including a common electrode plate lightguide 300 shown in FIG. 3 is applicable to the display electronic slurry module including a common electrode plate lightguide 400 shown in FIG. 4 as appropriate.

Referring to FIG. 4, a TFT backplane 410, typically fabricated using a glass substrate, supports the pixel electrodes 412 used to drive the display. The TFT backplane 410 can also be referred to as a TFT structure. The common electrode 424 is formed, along with a first coating 430 (e.g., a low index of refraction coating) on an optical layer 432, illustrated in FIG. 4 as the common electrode plate and fabricated in this embodiment using a glass plate. The common electrode 424 is in electrical communication with the pixel electrodes of the TFT backplane 410, i.e., the TFT structure, and is suitable for control of the TFT backplane. The common electrode plate is referred to as an optical layer 432 since this layer supports both light propagation and the common electrode corresponding to the pixel electrodes 412 supported on the TFT backplane 410. The first coating 430 has an index of refraction that is lower than the index of refraction of the optical layer 432. For instance, if the optical layer 432 is fabricated from glass with an index of refraction of n=1.5, then the first coating 430 will generally have an index of refraction in the range of n=1.4. As will be evident to one of skill in the art, the lower index of refraction provided by the first coating 430 results in total internal reflection for light propagating in the optical layer 432. In some implementations, the first coating 430 is fabricated by depositing a silicon coating or the like. A variety of coating techniques can be utilized, including CVD and/or other deposition processes. The first coating 430 can also be a polymeric coating, for example, an optically clear photoresist, with a low refractive index component disposed therein. A variety of coating techniques can be utilized to deposit the first coating 430, e.g., a polymeric coating, on the optical layer 432, for example, by spin coating, slot-die coating, stencil coating or any other similar type of coating technique.

The ink slurry 420 is separated by photo spacers 422 and sandwiched between the common electrode 424 of the optical layer 432 and the pixel electrodes 412 of the TFT backplane 410. The ink slurry 420, in conjunction with the photo spacers 422, define pixels that correspond to the pixel electrodes 412 of the TFT backplane 410.

In order to generate illumination light for the display, a light source 442 is mounted on a FPC 440. The FPC 440 is bonded to the optical layer 432 using adhesive 444. Light emitted by the light source 442, for example, an LED, propagates toward the edge 433 of the optical layer 432 and is coupled into the optical layer 432 by edge coupling before propagation and total internal reflection in the optical layer 432. The edge 433 of the optical layer 432 can be coated with an antireflection coating and/or the space between the light source 442 and the edge 433 of the optical layer 432 can be filled with an encapsulant in order to prevent intrusion of water or other substances into the space between the light source 442 and the edge 433 of the optical layer 432. Thus, the LED can emit light in a plane passing through the edge 433 of the optical layer 432, which is a horizontal plane in the embodiment illustrated in FIG. 4.

In order to implement optical scattering to illuminate the ink slurry 420, an optical scattering structure 436, also referred to as a set of light extraction features, is embedded in a second optical layer 434 that has an index of refraction greater than or equal to the index of refraction of the optical layer 432. When the second optical layer 434 has an index of refraction that is equal to the index of refraction of the optical layer 432, the second optical layer 434 is index matched and negligible reflection occurs at the interface between the optical layer 432 and the second optical layer 434.

In embodiments in which the optical layer 432 is glass, with an index of refraction of 1.5, the second optical layer 434 can have an index of refraction $n \geq 1.5$. In some embodiments, the optical scattering structure 436 includes voids, e.g., filled with air or other gas, in order to provide an index of refraction difference with respect to the second optical layer 434. In other embodiments, the optical scattering structure 436 includes features filled with the material used to fabricate the first coating 430. The optical scattering structure 436 thus forms a refractive structure that refracts light propagating in the optical layer 432 toward the ink slurry 420 adjacent the pixel electrodes 412 of the TFT backplane 410. In some embodiments, the second layer 434 is a layer of photoresist that is patterned to form the optical scattering structure 436. In other embodiments, the second coating 438 is fabricated using a film, for example, an optically clear adhesive, that can be laminated to the optical layer 432.

As illustrated in FIG. 4, the refraction efficiency of the optical scattering structure 436 varies as a function of the distance from the light source 442 in order to improve the uniformity of the display output. The periodicity of the features of the optical scattering structure 436 increases as a function of the distance from the light source 442 in the embodiment illustrated in FIG. 4, but other techniques can be utilized to implement varying refraction efficiency, including varying feature height, or the like. One of ordinary skill in the art would recognize many variations, modifications, and alternatives.

Although the optical scattering structure 436 includes refractive structures in the embodiment illustrated in FIG. 4, this is not required and, in other embodiments, diffractive structures can be utilized as appropriate to the particular application. Moreover, referring to FIGS. 3 and 4, although the optical scattering structure 336 is disposed on the user-side of the optical layer 332 and the optical scattering structure 436 is disposed on the opposing surface of the optical layer 432, i.e., the surface opposite the user-side of the optical layer 432, some embodiments utilize optical scattering structures on both the user-side and the opposing side of the optical layer.

A second coating 438 is coupled to the optical layer 432. The second coating 438 has an index of refraction that is lower than the index of refraction of the optical layer 432. As will be evident to one of skill in the art, the lower index of refraction provided by the second coating 438 results in total internal reflection for light propagating in the optical layer 432. The second coating 438, which can be a silicon-based OCA with an index of refraction of ~n=1.4, has an index of refraction that is lower than the index of refraction of the optical layer 432. The second coating 438 can be laminated or formed using a liquid coating process.

Thus, referring to FIG. 4, the optical scattering structure 436 embedded in the second optical layer 434 produces refraction of light propagating in the optical layer 432 that illuminates the ink slurry 420 for display purposes. Moreover, the second coating 438, which also has an index of refraction that is lower than the index of refraction of the optical layer 432 and second coating 438, produces total internal reflection at the interface of the second coating 438 and, as a result, total internal reflection for light propagating in the optical layer 432. Additionally, the first coating 430, with an index of refraction that is lower than the index of refraction of the optical layer 432, produces total internal reflection at the interface of the first coating 430 and the second optical layer 434 for light propagating in the optical layer 432. As a result, the optical structure shown in FIG. 4 implements a lightguide functionality that is characterized by both waveguiding by total internal reflection and outcoupling by the optical scattering structure 436. Thus, the common electrode plate serves not only as the substrate on which the common electrode is supported, but also as a lightguide that enables frontlight functionality to be implemented in the display electronic slurry module. Pixelated light emitted by the display is viewed by a user located above the display in the embodiment illustrated in FIG. 4. Thus, the surface of the optical layer 432 adjacent the second optical layer 434 can be referred to as a user side surface.

Figure 5:
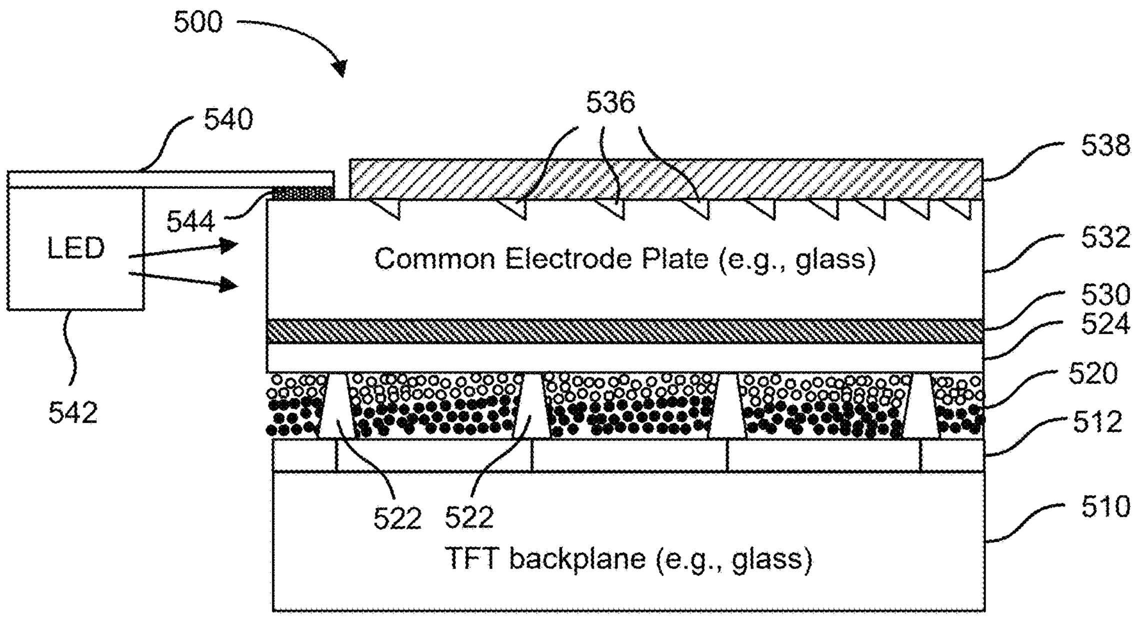
FIG. 5 is a simplified schematic diagram illustrating a display electronic slurry module including an optical scattering structure embedded in a common electrode plate lightguide according to an embodiment of the present disclosure.

FIG. 5 is a simplified schematic diagram illustrating a display electronic slurry module including an optical scattering structure embedded in a common electrode plate lightguide according to an embodiment of the present disclosure. The display electronic slurry module including an optical scattering structure embedded in a common electrode plate lightguide 500 illustrated in FIG. 5 shares common elements with the display electronic slurry module including a common electrode plate lightguide 300 illustrated in FIG. 3 and the discussion provided in relation to the display electronic slurry module including a common electrode plate lightguide 300 shown in FIG. 3 is applicable to the display electronic slurry module including an optical scattering structure embedded in a common electrode plate lightguide 500 shown in FIG. 5 as appropriate.

Referring to FIG. 5, a TFT backplane 510, typically fabricated using a glass substrate, supports the pixel electrodes 512 used to drive the display.

The common electrode 524 is formed, along with a first coating 530 (e.g., a low index of refraction coating) on an optical layer 532, illustrated in FIG. 5 as the common electrode plate fabricated in this embodiment using a glass plate. The common electrode plate is referred to as an optical layer 532 since this layer supports both light propagation and the common electrode corresponding to the pixel electrodes 512 supported on the TFT backplane 510. The first coating 530 has an index of refraction that is lower than the index of refraction of the optical layer 532. For instance, if the optical layer 532 is fabricated from glass with an index of refraction of n=1.5, then the first coating 530 will generally have an index of refraction in the range of n=1.4. As will be evident to one of skill in the art, the lower index of refraction provided by the first coating 530 results in total internal reflection for light propagating in the optical layer 532. In some implementations, the first coating 530 is fabricated by depositing a silicon coating or the like. A variety of coating techniques can be utilized, including CVD and/or other deposition processes. The first coating 530 can also be a polymeric coating, for example, an optically clear photoresist, with a low refractive index component disposed therein. A variety of coating techniques can be utilized to deposit the first coating 530, e.g., a polymeric coating, on the optical layer 532, for example, by spin coating, slot-die coating, stencil coating or any other similar type of coating technique. Thus, in the illustrated embodiment, the coating is deposited on and in contact with the optical layer and the common electrode is deposited on and in contact with the coating.

The ink slurry 520 is separated by photo spacers 522 and sandwiched between the common electrode 524 of the optical layer 532 and the pixel electrodes 512 of the TFT backplane 510. The ink slurry 520, in conjunction with the photo spacers 522, define pixels that correspond to the pixel electrodes 512 of the TFT backplane 510.

In order to generate illumination light for the display, a light source 542 is mounted on a FPC 540. The FPC 540 is bonded to the optical layer 532 using adhesive 544. Light emitted by the light source 542, for example, an LED, propagates toward the edge of the optical layer 532 and is coupled into the optical layer 532 by edge coupling before propagation and total internal reflection in the optical layer 532. The edge of the optical layer 532 can be coated with an antireflection coating and/or the space between the light source 542 and the edge of the optical layer 532 can be filled with an encapsulant in order to prevent intrusion of water or other substances into the space between the light source 542 and the edge of the optical layer 532.

Referring once again to FIG. 5, an optical scattering structure 536, also referred to as a set of light extraction features, is fabricated in the optical layer 532. Thus, the optical scattering structure 536 is embedded or disposed in the optical layer 532. In the embodiment illustrated in FIG. 5, the optical layer 532 is patterned, for example, using photolithography or laser etching, and the optical scattering structure 536 is etched into the optical layer 532 to form the optical scattering structure 536.

A second coating 538 is coupled to the optical layer 532 and the optical scattering structure 536. The second coating 538 has an index of refraction that is lower than the index of refraction of the optical layer 532. As will be evident to one of skill in the art, the lower index of refraction provided by the second coating 538 results in total internal reflection for light propagating in the optical layer 532. The second coating 538 can be deposited or laminated, for example, when the second coating 538 is an OCA, to provide the low index of refraction layer abutting the optical layer 532. By way of example, silicon-based OCAs have an index of refraction in the range of n=1.4, which is suitable for providing the desired total internal reflection at the interface of the optical layer 532 and the second coating 538.

In some embodiments, the optical scattering structure 536 includes voids, e.g., filled with air or other gas, in order to provide an index of refraction difference with respect to the optical layer 532. In other embodiments, the optical scattering structure 536 includes features filled with the material used to fabricate the second coating 538 or other suitable material with suitable optical properties including index of refraction. The optical scattering structure 536 thus forms a diffractive structure similar to a diffraction grating that diffracts light propagating in the optical layer 532 toward the ink slurry 520 adjacent the pixel electrodes 512 of the TFT backplane 510.

As illustrated in FIG. 5, the diffraction efficiency of the optical scattering structure 536 varies as a function of the distance from the light source 542 in order to improve the uniformity of the display output. The periodicity of the features of the optical scattering structure 536 increases as a function of the distance from the light source 542 in the embodiment illustrated in FIG. 5, but other techniques can be utilized to implement varying diffraction efficiency, including varying grating teeth height, or the like. One of ordinary skill in the art would recognize many variations, modifications, and alternatives.

Although the optical scattering structure 536 includes diffractive structures in the embodiment illustrated in FIG. 5, this is not required and, in other embodiments, refractive structures can be utilized as appropriate to the particular application.

Thus, referring to FIG. 5, the first coating 530, with an index of refraction that is lower than the index of refraction of the optical layer 532, produces total internal reflection at the interface of the first coating 530 and the optical layer 532 for light propagating in the optical layer 532. Additionally, the optical scattering structure 536 embedded in the optical layer 532 produces diffraction of light propagating in the optical layer 532 that illuminates the ink slurry 520 for display purposes. Moreover, the second coating 538, which also has an index of refraction that is lower than the index of refraction of the optical layer 532, produces total internal reflection at the interface of the second coating 538 and, as a result, total internal reflection for light propagating in the optical layer 532. As a result, the optical structure shown in FIG. 5 implements a lightguide functionality that is characterized by both waveguiding by total internal reflection and outcoupling by the optical scattering structure 536. Thus, the common electrode plate serves not only as the substrate on which the common electrode is supported, but also as a lightguide that enables frontlight functionality to be implemented in the display electronic slurry module. Pixelated light emitted by the display is viewed by a user located above the display in the embodiment illustrated in FIG. 5. Thus, the surface of the optical layer 532 adjacent the optical scattering structure 536 can be referred to as a user side surface.

Figure 6:
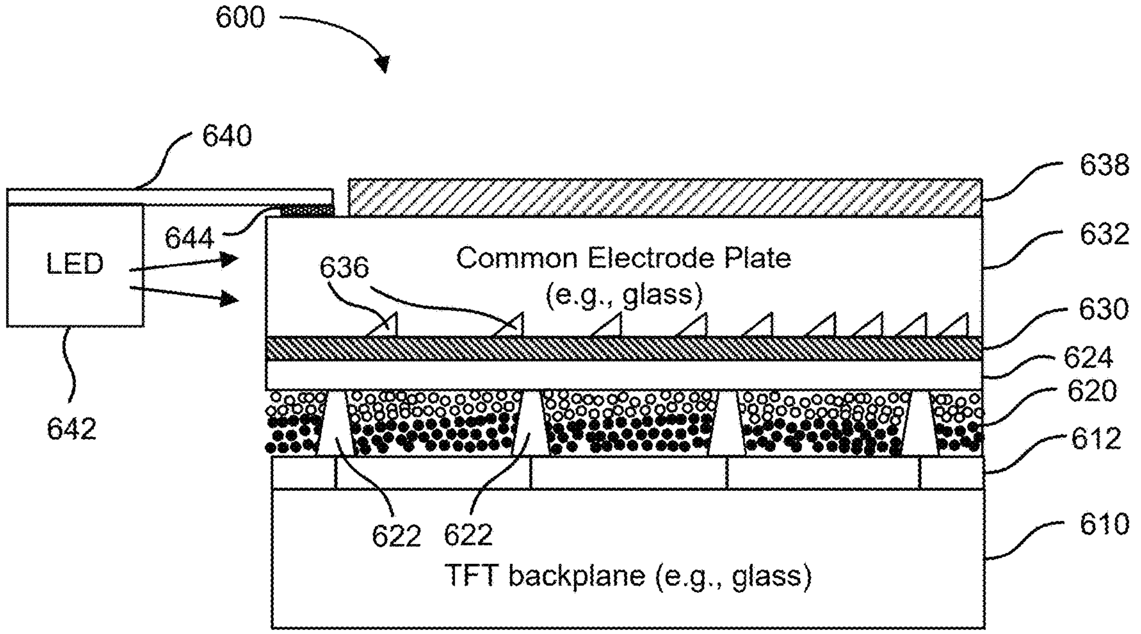
FIG. 6 is a simplified schematic diagram illustrating a display electronic slurry module including an optical scattering structure embedded in a common electrode plate lightguide according to another embodiment of the present disclosure.

FIG. 6 is a simplified schematic diagram illustrating a display electronic slurry module including an optical scattering structure embedded in a common electrode plate lightguide according to another embodiment of the present disclosure. The display electronic slurry module including an optical scattering structure embedded in a common electrode plate lightguide 600 illustrated in FIG. 6 shares common elements with the display electronic slurry module including a common electrode plate lightguide 400 illustrated in FIG. 4 and the discussion provided in relation to the display electronic slurry module including a common electrode plate lightguide 400 shown in FIG. 4 is applicable to the display electronic slurry module including an optical scattering structure embedded in a common electrode plate lightguide 600 shown in FIG. 6 as appropriate.

Referring to FIG. 6, a TFT backplane 610, typically fabricated using a glass substrate, supports the pixel electrodes 612 used to drive the display. The common electrode 624 is formed, along with a first coating 630 (e.g., a low index of refraction coating) on an optical layer 632, illustrated in FIG. 6 as the common electrode plate and fabricated in this embodiment using a glass plate. The common electrode plate is referred to as an optical layer 632 since this layer supports both light propagation and the common electrode corresponding to the pixel electrodes 612 supported on the TFT backplane 610. The first coating 630 has an index of refraction that is lower than the index of refraction of the optical layer 632. For instance, if the optical layer 632 is fabricated from glass with an index of refraction of n=1.5, then the first coating 630 will generally have an index of refraction in the range of n=1.4. As will be evident to one of skill in the art, the lower index of refraction provided by the first coating 630 results in total internal reflection for light propagating in the optical layer 632. In some implementations, the first coating 630 is fabricated by depositing a silicon coating or the like. A variety of coating techniques can be utilized, including CVD and/or other deposition processes. The first coating 630 can also be a polymeric coating, for example, an optically clear photoresist, with a low refractive index component disposed therein. A variety of coating techniques can be utilized to deposit the first coating 630, e.g., a polymeric coating, on the optical layer 632, for example, by spin coating, slot-die coating, stencil coating or any other similar type of coating technique.

The ink slurry 620 is separated by photo spacers 622 and sandwiched between the common electrode 624 of the optical layer 632 and the pixel electrodes 612 of the TFT backplane 610. The ink slurry 620, in conjunction with the photo spacers 622, define pixels that correspond to the pixel electrodes 612 of the TFT backplane 610.

In order to generate illumination light for the display, a light source 642 is mounted on a FPC 640. The FPC 640 is bonded to the optical layer 632 using adhesive 644. Light emitted by the light source 642, for example, an LED, propagates toward the edge of the optical layer 632 and is coupled into the optical layer 632 by edge coupling before propagation and total internal reflection in the optical layer 632. The edge of the optical layer 632 can be coated with an antireflection coating and/or the space between the light source 642 and the edge of the optical layer 632 can be filled with an encapsulant in order to prevent intrusion of water or other substances into the space between the light source 642 and the edge of the optical layer 632.

In order to implement optical scattering to illuminate the ink slurry 620, optical scattering structure 636, also referred to as a set of light extraction features, is embedded in the optical layer 632. In the embodiment illustrated in FIG. 6, the optical layer 632 is patterned, for example, using photolithography or laser etching, and the optical scattering structure 636 is etched into the optical layer 632 to form the optical scattering structure 636.

In some embodiments, the optical scattering structure 636 includes voids, e.g., filled with air or other gas, in order to provide an index of refraction difference with respect to the optical layer 632. In other embodiments, the optical scattering structure 636 includes features filled with the material used to fabricate the first coating 630 or other suitable material with suitable optical properties including index of refraction. The optical scattering structure 636 thus forms a refractive structure that refracts light propagating in the optical layer 632 toward the ink slurry 620 adjacent the pixel electrodes 612 of the TFT backplane 610.

As illustrated in FIG. 6, the refraction efficiency of the optical scattering structure 636 varies as a function of the distance from the light source 642 in order to improve the uniformity of the display output. The periodicity of the features of the optical scattering structure 636 increases as a function of the distance from the light source 642 in the embodiment illustrated in FIG. 6, but other techniques can be utilized to implement varying refraction efficiency, including varying feature height, or the like. One of ordinary skill in the art would recognize many variations, modifications, and alternatives.

Although the optical scattering structure 636 includes refractive features in the embodiment illustrated in FIG. 6, this is not required and, in other embodiments, diffractive structures can be utilized as appropriate to the particular application. Moreover, referring to FIGS. 5 and 6, although the optical scattering structure 536 is disposed on the user-side of the optical layer 532 and the optical scattering structure 636 is disposed on the opposing surface of the optical layer 632, i.e., the surface opposite the user-side of the optical layer 632, some embodiments utilize optical scattering structures on both the user-side and the opposing side of the optical layer.

A second coating 638 is coupled to the optical layer 632. The second coating 638 has an index of refraction that is lower than the index of refraction of the optical layer 632. As will be evident to one of skill in the art, the lower index of refraction provided by the second coating 638 results in total internal reflection for light propagating in the optical layer 632. The second coating 638 can be deposited or laminated, for example, when the second coating 638 is an OCA, to provide the low index of refraction layer abutting the optical layer 632. In some embodiments, first coating 630 and second coating 638 are deposited concurrently in a deposition process that coats both sides of the optical layer 632. In other embodiments, for example, when the first coating 630 is a formed using a deposition process and the second coating 638 is formed using a liquid coating process, these coatings can be formed separately.

Thus, referring to FIG. 6, the optical scattering structure 636 embedded in the optical layer 632 produces refraction of light propagating in the optical layer 632 that illuminates the ink slurry 620 for display purposes. Moreover, the second coating 638, which also has an index of refraction that is lower than the index of refraction of the optical layer 632, produces total internal reflection at the interface of the second coating 638 and, as a result, total internal reflection for light propagating in the optical layer 632. Additionally, the first coating 630, with an index of refraction that is lower than the index of refraction of the optical layer 632, produces total internal reflection at the interface of the first coating 630 and the optical layer 632. As a result, the optical structure shown in FIG. 6 implements a lightguide functionality that is characterized by both waveguiding by total internal reflection and outcoupling by the optical scattering structure 636. Thus, the common electrode plate serves not only as the substrate on which the common electrode is supported, but also as a lightguide that enables frontlight functionality to be implemented in the display electronic slurry module. Pixelated light emitted by the display is viewed by a user located above the display in the embodiment illustrated in FIG. 6.

Figure 7:
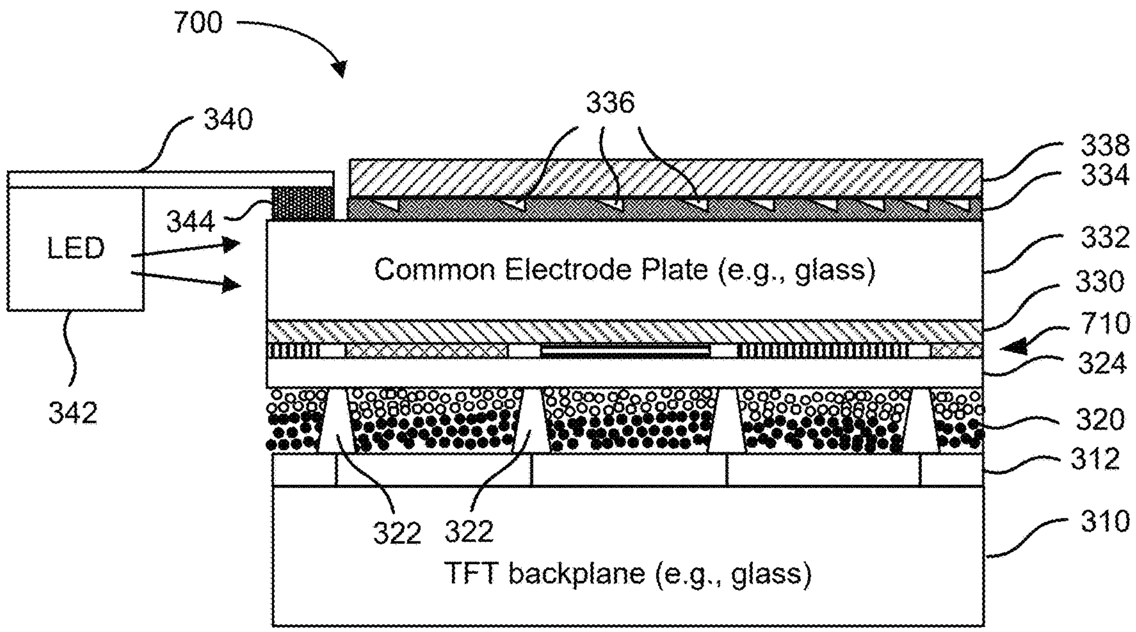
FIG. 7 is a simplified schematic diagram illustrating a color display electronic slurry module including a common electrode plate lightguide according to an embodiment of the present disclosure.

FIG. 7 is a simplified schematic diagram illustrating a color display electronic slurry module including a common electrode plate lightguide according to an embodiment of the present disclosure. The color display electronic slurry module including a common electrode plate lightguide 700 illustrated in FIG. 7 shares common elements with the display electronic slurry module including a common electrode plate lightguide 300 illustrated in FIG. 3 and the discussion provided in relation to the display electronic slurry module including a common electrode plate lightguide 300 shown in FIG. 3 is applicable to the color display electronic slurry module including a common electrode plate lightguide 700 shown in FIG. 7 as appropriate.

Referring to FIG. 7, the TFT backplane 310 and the pixel electrodes 312 are illustrated. The common electrode 324 is formed, along with a first coating 330, on the optical layer 332. The ink slurry 320 is separated by the photo spacers 322 and sandwiched between the common electrode 324 of the optical layer 332 and the pixel electrodes 312 of the TFT backplane 310. Additionally, the light source 342 is mounted on the FPC 340, which is bonded to the optical layer 332 or the second optical layer 334 using adhesive 344. The optical scattering structure 336 are also coupled to the optical layer 332. A second coating 338 is coupled to the second optical layer 334 and the optical scattering structure 336.

In order to implement a multi-color display, e.g., an RGB display, a color filter array 710 is inserted, i.e., disposed, between the common electrode 324 and the first coating 330. Each of the color filters in the color filter array is aligned with one of the pixels in the ink slurry 320 defined by the photo spacers 322. In other embodiments, the color filter array 710 is inserted at another position in the color display stack as appropriate to the particular application.

Figure 8:
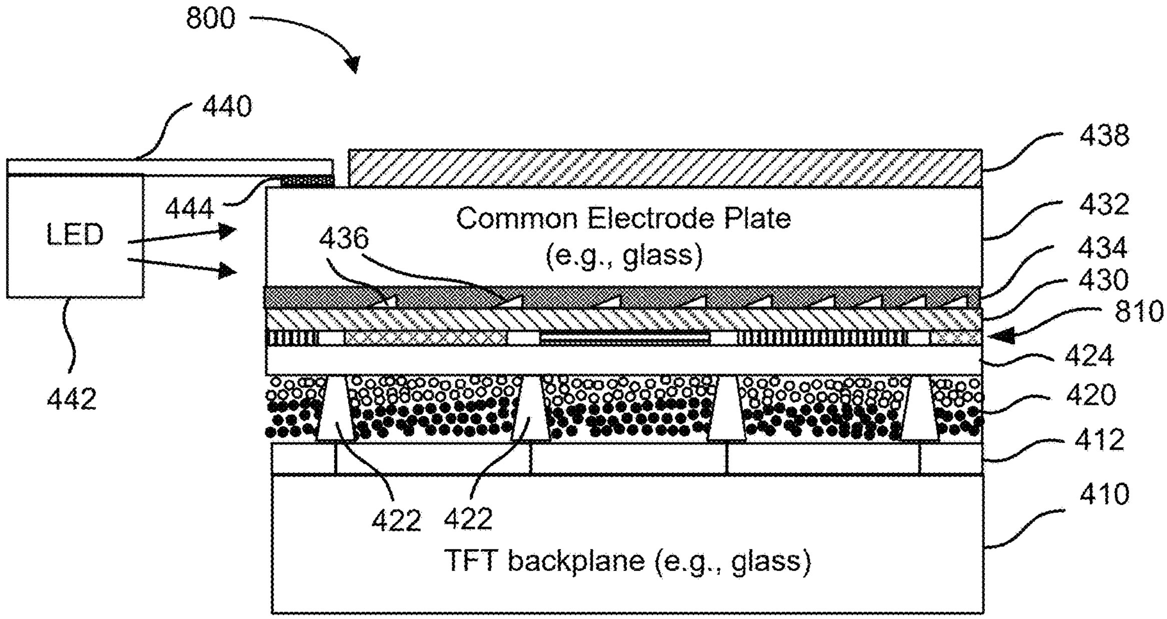
FIG. 8 is a simplified schematic diagram illustrating a color display electronic slurry module including a common electrode plate lightguide according to another embodiment of the present disclosure.

FIG. 8 is a simplified schematic diagram illustrating a color display electronic slurry module including a common electrode plate lightguide according to another embodiment of the present disclosure. The color display electronic slurry module including a common electrode plate lightguide 800 illustrated in FIG. 8 shares common elements with the display electronic slurry module including a common electrode plate lightguide 400 illustrated in FIG. 4 and the discussion provided in relation to the display electronic slurry module including a common electrode plate lightguide 400 shown in FIG. 4 is applicable to the color display electronic slurry module including a common electrode plate lightguide 800 shown in FIG. 8 as appropriate.

Referring to FIG. 8, the TFT backplane 410 and the pixel electrodes 412 used to drive the display are illustrated. The common electrode 424 is formed, along with the first coating 430 on the optical layer 432.

The ink slurry 420 is separated by the photo spacers 422 and sandwiched between the common electrode 424 of the optical layer 432 and the pixel electrodes 412 of the TFT backplane 410. The light source 442 is mounted on a FPC 440, which is bonded to the optical layer 432 using adhesive 444. The optical scattering structure 436 are embedded in the second optical layer 434. The second coating 438 is coupled to the optical layer 432.

In order to implement a multi-color display, e.g., an RGB display, a color filter array 810 is inserted between the common electrode 424 and the first coating 430. Each of the color filters in the color filter array is aligned with one of the pixels in the ink slurry 420 defined by the photo spacers 422. In other embodiments, the color filter array 810 is inserted at another position in the color display stack as appropriate to the particular application.

Figure 9:
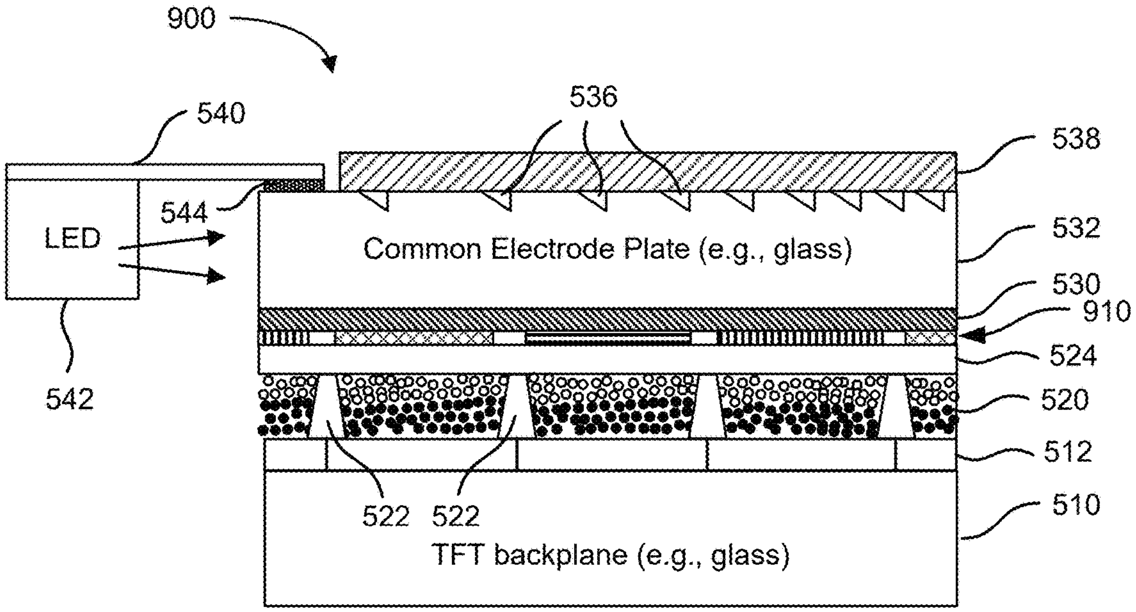
FIG. 9 is a simplified schematic diagram illustrating a color display electronic slurry module including an optical scattering structure embedded in a common electrode plate lightguide according to an embodiment of the present disclosure.

FIG. 9 is a simplified schematic diagram illustrating a color display electronic slurry module including an optical scattering structure embedded in a common electrode plate lightguide according to an embodiment of the present disclosure. The color display electronic slurry module including an optical scattering structure embedded in a common electrode plate lightguide 900 illustrated in FIG. 9 shares common elements with the display electronic slurry module including an optical scattering structure embedded in a common electrode plate lightguide 500 illustrated in FIG. 5 and the discussion provided in relation to the display electronic slurry module including an optical scattering structure embedded in a common electrode plate lightguide 500 shown in FIG. 5 is applicable to the color display electronic slurry module including an optical scattering structure embedded in a common electrode plate lightguide 900 shown in FIG. 9 as appropriate.

Referring to FIG. 9, the TFT backplane 510 and the pixel electrodes 512 used to drive the display are illustrated. The common electrode 524 is formed, along with a first coating 530 on the optical layer 532. The ink slurry 520 is separated by the photo spacers 522 and sandwiched between the common electrode 524 of the optical layer 532 and the pixel electrodes 512 of the TFT backplane 510. The light source 542 is mounted on a FPC 540, which is bonded to the optical layer 532 using adhesive 544. The optical scattering structure 536 are fabricated in the optical layer 532. The second coating 538 is coupled to the optical layer 532 and the optical scattering structure 536.

In order to implement a multi-color display, e.g., an RGB display, a color filter array 910 is inserted between the common electrode 524 and the first coating 530. Each of the color filters in the color filter array is aligned with one of the pixels in the ink slurry 520 defined by the photo spacers 522. In other embodiments, the color filter array 910 is inserted at another position in the color display stack as appropriate to the particular application.

Figure 10:
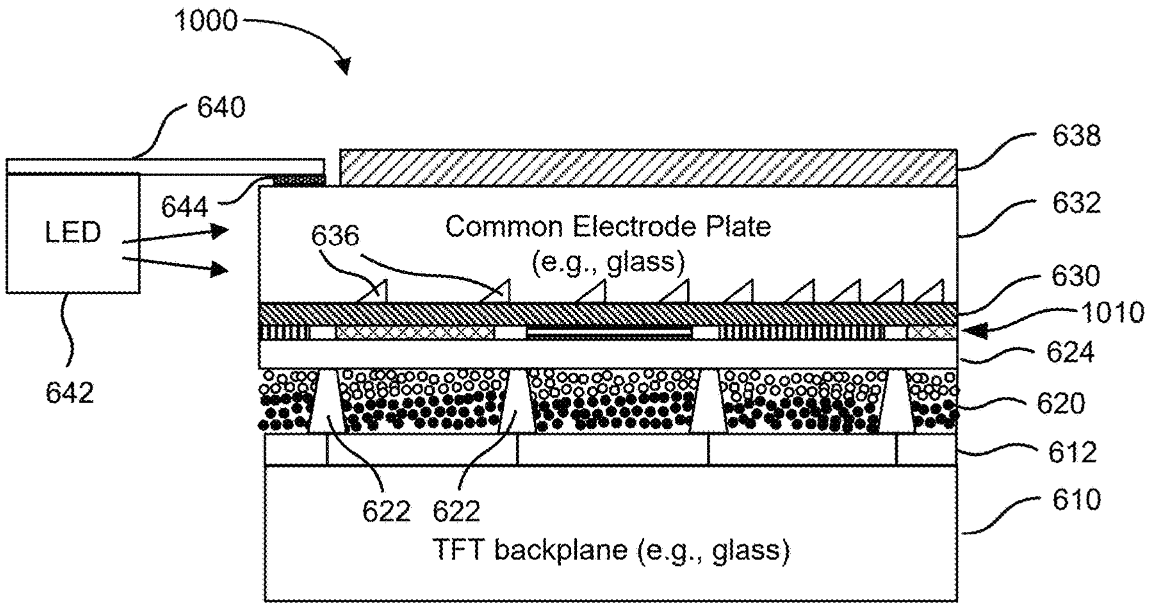
FIG. 10 is a simplified schematic diagram illustrating a color display electronic slurry module including an optical scattering structure embedded in a common electrode plate lightguide according to another embodiment of the present disclosure.

FIG. 10 is a simplified schematic diagram illustrating a color display electronic slurry module including an optical scattering structure embedded in a common electrode plate lightguide according to another embodiment of the present disclosure. The color display electronic slurry module including an optical scattering structure embedded in a common electrode plate lightguide 1000 illustrated in FIG. 10 shares common elements with the display electronic slurry module including an optical scattering structure embedded in a common electrode plate lightguide 600 illustrated in FIG. 6 and the discussion provided in relation to the display electronic slurry module including an optical scattering structure embedded in a common electrode plate lightguide 600 shown in FIG. 6 is applicable to the color display electronic slurry module including an optical scattering structure embedded in a common electrode plate lightguide 1000 shown in FIG. 10 as appropriate.

Referring to FIG. 10, the TFT backplane 610 and the pixel electrodes 612 used to drive the display are illustrated. The common electrode 624 is formed, along with a first coating 630 on the optical layer 632. The ink slurry 620 is separated by the photo spacers 622 and sandwiched between the common electrode 624 of the optical layer 632 and the pixel electrodes 612 of the TFT backplane 610. The light source 642 is mounted on a FPC 640, which is bonded to the optical layer 632 using adhesive 644. The optical scattering structure 636 are embedded in the optical layer 632. The second coating 638 is coupled to the optical layer 632.

In order to implement a multi-color display, e.g., an RGB display, a color filter array 1010 is inserted between the common electrode 624 and the first coating 630. Each of the color filters in the color filter array is aligned with one of the pixels in the ink slurry 620 defined by the photo spacers 622. In other embodiments, the color filter array 1010 is inserted at another position in the color display stack as appropriate to the particular application.

In some e-reader displays, several discrete components, for example, a cover lens, a touch sensor, a frontlight, and an electronic display module, are laminated together using optical clear adhesive films. Because of the multiple components and adhesive layers, not only is the total thickness of the display stack large, but the display contrast ratio is reduced due to the numerous interlayer reflections produced as light propagates through the multiple components present in the display stack.

As described more fully below, embodiments of the present disclosure provide a full display stack with both in-cell touch functionality and frontlight functionality integrated with the display electronic slurry module. In some embodiments, the touch sensor is integrated with the common electrode plate of the display electronic slurry module, whereas in other embodiments, the touch sensor is integrated with the TFT backplane of the display electronic slurry module. In implementations in which the touch sensor is integrated with the TFT backplane, the touch sensor can be manufactured as part of TFT fabrication process. Thus, the touch sensor and the display module can share common flexible printed circuits and use a touch and display driver integration integrated circuit to drive both the display and the touch sensor based on a time-sharing drive mechanism. In some embodiments, the frontlight is integrated with the common electrode plane of the display electronic slurry module as discussed in relation to FIGS. 3-10. As a result, the optical scattering structure, i.e., the set of light extraction features, can be present either on the user side of the optical layer, i.e., the common electrode plate, or the side of the optical layer adjacent the TFT backplane. Moreover, as discussed above, coating(s) with an index of refraction lower than the index of refraction of the common electrode plate can be formed, for example, by deposition or lamination, on the user side, the TFT backplane side, or both sides of the common electrode plate.

Figure 11A:
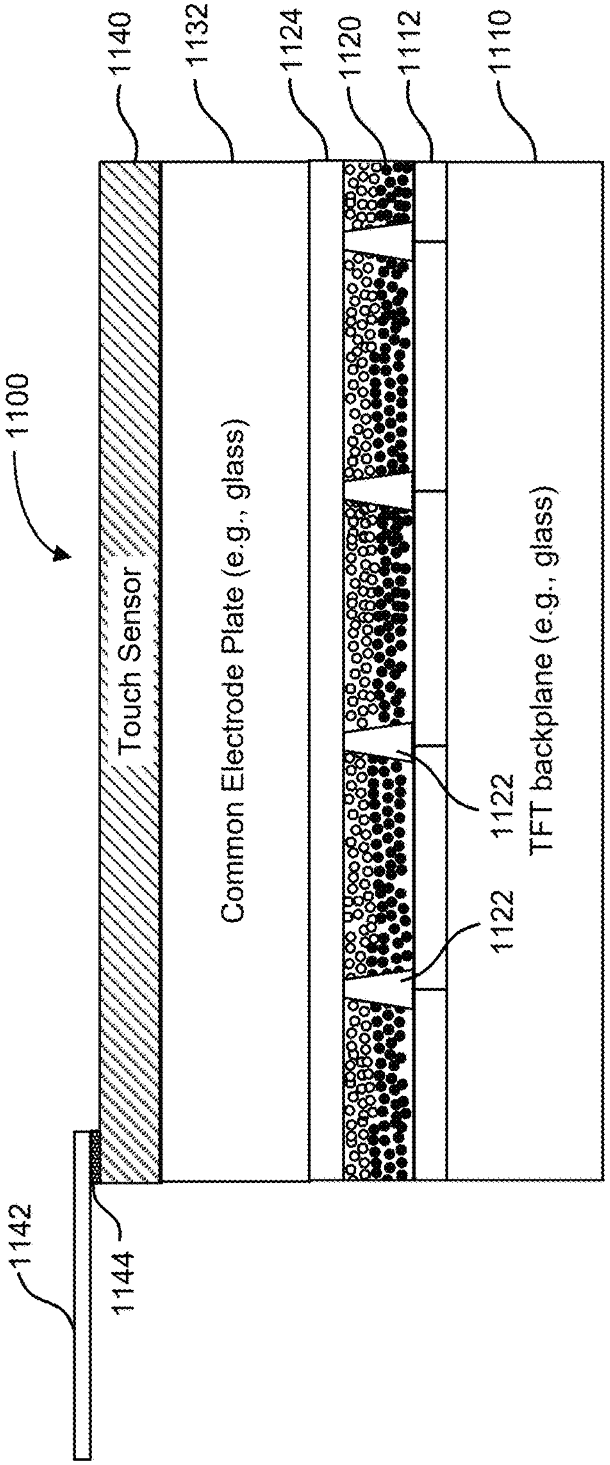
FIG. 11A is a simplified schematic diagram illustrating an integrated display module including a display electronic slurry module with an integrated touch sensor module according to an embodiment of the present disclosure.

FIG. 11A is a simplified schematic diagram illustrating an integrated display module 1100 including a display electronic slurry module with an integrated touch sensor module according to an embodiment of the present disclosure. In the embodiment illustrated in FIG. 11A, the touch sensor module 1140, also referred to as a touch sensor, is positioned directly on the user side surface of the common electrode plate 1132 of the display electronic slurry module. As a result, this embodiment can be referred to as a display electronic slurry module with on-cell touch functionality. The touch sensor module can be based on a dual layer design or a single layer design with bridges. For instance, a first patterned layer of a transparent conductive material can be formed on the supporting surface and a patterned insulation layer can be utilized to separate the first patterned layer from a second patterned layer, referred to as a bridge layer. As a result, a variety of materials can be utilized in fabricating the touch sensor, including a number of transparent conductive materials such as indium tin oxide, silver nanowires, a metal mesh, polymer ink, graphene, or the like. In order to operate the touch sensor, a touch IC mounted flexible printed circuit can be utilized to connect the touch sensor positioned on the common electrode plate to the touch driver in the main logic board.

Referring to FIG. 11A, a TFT backplane 1110 supports the pixel electrodes 1112 used to drive the display. The common electrode 1124 is formed on the common electrode plate 1132. The ink slurry 1120 is separated by photo spacers 1122 and sandwiched between the common electrode 1124 of the common electrode plate 1132 and the pixel electrodes 1112 of the TFT backplane 1110. The ink slurry 1120, in conjunction with the photo spacers 1122, define pixels that correspond to the pixel electrodes 1112 of the TFT backplane 1110.

The substantially planar, user side surface of the common electrode plate 1132 provides a suitable surface for formation, e.g., deposition, of the components of the touch sensor.

The touch sensor module 1140 can include multiple layers of patterned transparent conductive material(s), also referred to as touch films or patterned layer(s). One or more of these patterned transparent conductive materials can be, for example, as a result of a deposition process, in physical contact with the common electrode plate 1132. In some embodiments, the touch films may include patterned layers made from indium tin oxide (ITO) or the like, and the patterns may form rows and columns. Such patterns may provide a grid of capacitors that may project an electric field and the capacitance of one or more capacitors may be changed by the placement of a finger near the touch sensor module 1140. The patterns may be coupled to signal lines or traces along the outer edge or border of the touch sensor module 1140. Thus, suitable transparent conductive material(s) can be deposited and patterned on the user side surface of the common electrode plate 1132 to form the single layer or multilayer touch sensor circuitry. FPC 1142 provides for electrical connectivity to the touch sensor module 1140 and can be bonded to the touch sensor module 1140 using an anisotropic conductive film (ACF) 1144.

In contrast with conventional displays that utilize a separate and distinct touch sensor module, the components of the touch sensor module 1140 are formed directly on the user side surface of the common electrode plate 1132, which also supports the common electrode for the display electronic slurry module.

Figure 11B:
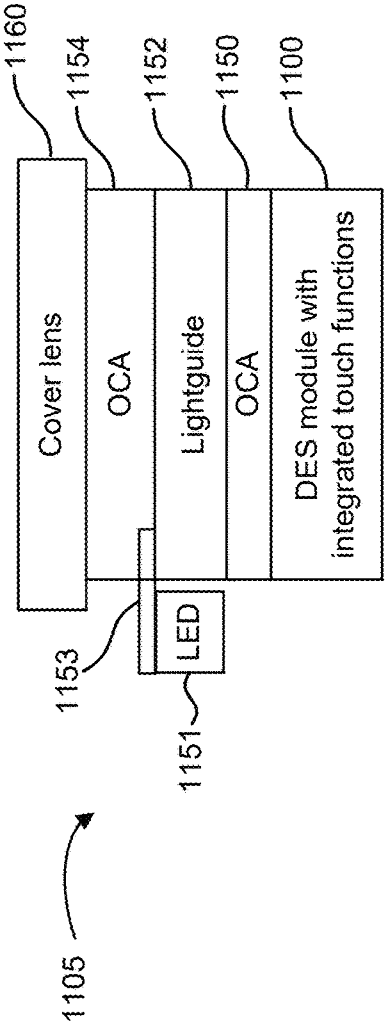
FIG. 11B is a simplified schematic diagram illustrating a display module with the integrated display module of FIG. 11A according to an embodiment of the present disclosure.

FIG. 11B is a simplified schematic diagram illustrating a display module 1105 with the integrated display module 1100 of FIG. 11A according to an embodiment of the present disclosure. The display module 1105 includes a display electronic slurry module with an integrated touch sensor module combined with a lightguide module. In FIG. 11B, a full display stack is illustrated that includes a display electronic slurry module with an integrated touch sensor module joined to a lightguide module using optically clear adhesive layers. Referring to FIG. 11B, the integrated display module 1100 with the integrated touch sensor module shown in FIG. 11A is joined to a lightguide module 1152 using OCA 1150. As discussed above, light source 1151 is mounted on flexible printed circuit 1153, which is bonded to the lightguide module 1152. OCA 1154 is utilized to join a cover lens 1160 to the user side of the lightguide module 1152.

Thus, the display module 1105 illustrated in FIG. 11B integrates a display electronic slurry module including touch functionality with a discrete lightguide module to provide a compact and lightweight display.

Figure 12A:
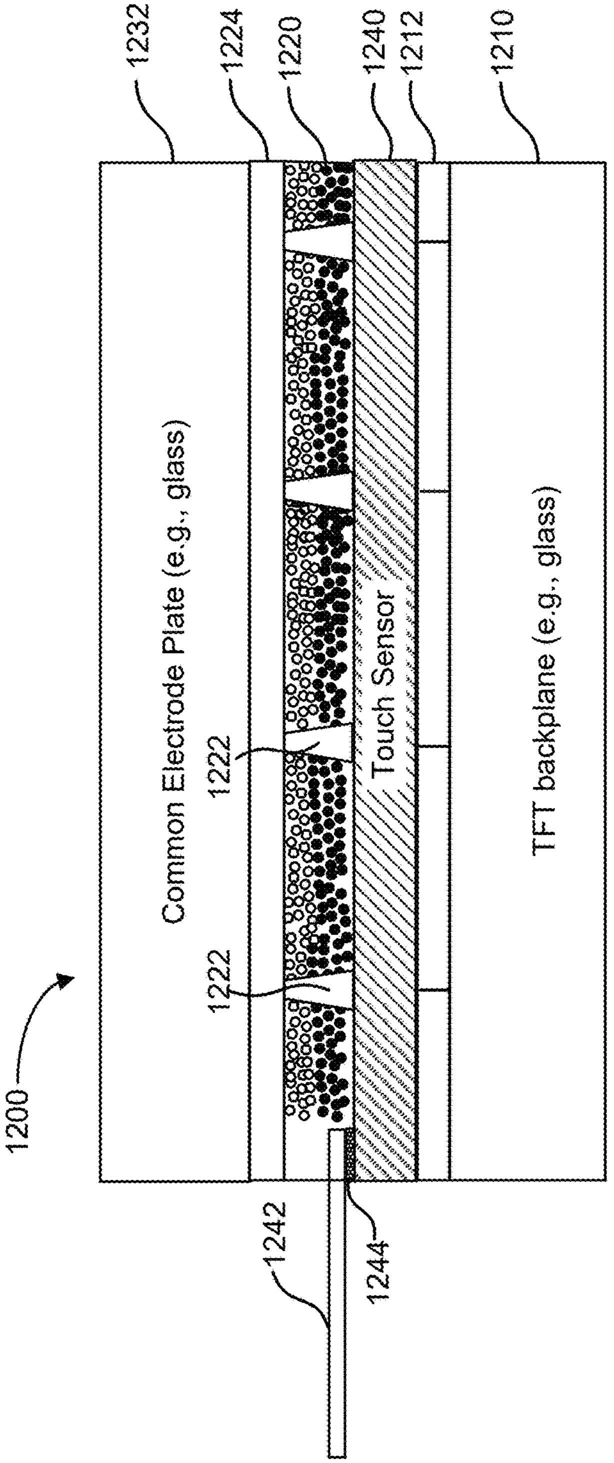
FIG. 12A is a simplified schematic diagram illustrating an integrated display module including a display electronic slurry module with an integrated touch sensor module according to another embodiment of the present disclosure.

FIG. 12A is a simplified schematic diagram illustrating an integrated display module 1200 including a display electronic slurry module with an integrated touch sensor module according to another embodiment of the present disclosure.

Referring to FIG. 12A, a TFT backplane 1210 supports the pixel electrodes 1212 used to drive the display. The common electrode 1224 is formed on the common electrode plate 1232. The ink slurry 1220 is separated by photo spacers 1222 and sandwiched between the common electrode 1224 of the common electrode plate 1232 and the touch sensor module 1240, which is formed on or in conjunction with the pixel electrodes 1212 of the TFT backplane 1210. The ink slurry 1220, in conjunction with the photo spacers 1222, define pixels that correspond to the pixel electrodes 1212 of the TFT backplane 1210.

In the embodiment illustrated in FIG. 12A, the touch sensor module 1240, also referred to as a touch sensor, is positioned directly on the thin film transistor structure (i.e., the TFT backplane) opposite the user side surface of the common electrode plate 1232 of the display electronic slurry module. As a result, this embodiment can be referred to as a display electronic slurry module with in-cell touch functionality. Thus, this touch sensor design enables integration of the components of the touch sensor module into the TFT circuit design and the components of the touch sensor module can be manufactured as part of TFT fabrication process. FPC 1242 provides for electrical connectivity to the touch sensor module 1240 and can be bonded to the touch sensor module 1240 using adhesive 1244.

In order to operate the touch sensor, a flexible printed circuit can be utilized to connect the touch sensor positioned on the TFT backplane to the touch driver in the main logic board. In another embodiment, the touch sensor and the TFT driving circuit are combined into the same driver IC, which can be referred to as a Touch Display Driver Integration IC (TDDIC) through only one FPC 1242.

Figure 12B:
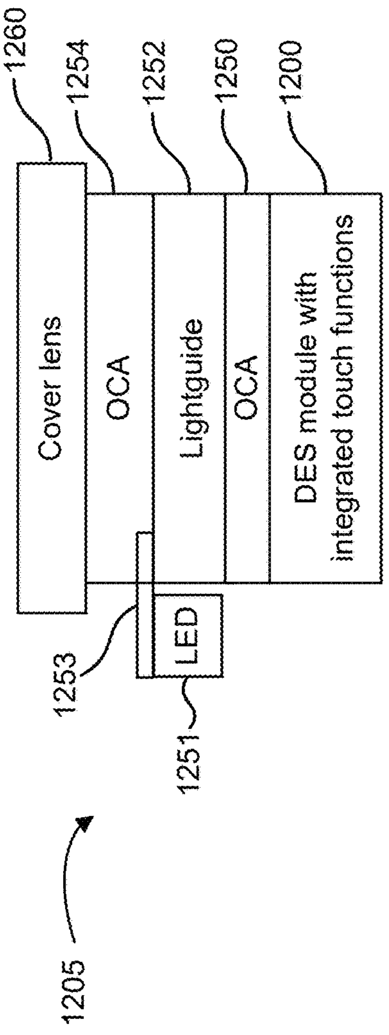
FIG. 12B is a simplified schematic diagram illustrating a display module with the integrated display module of FIG. 12A according to another embodiment of the present disclosure.

FIG. 12B is a simplified schematic diagram illustrating a display module 1205 with the integrated display module 1200 of FIG. 12A according to another embodiment of the present disclosure. In FIG. 12B, a full display stack is illustrated that includes a display electronic slurry module with an integrated touch sensor module joined to a lightguide module using optically clear adhesive layers. Referring to FIG. 12B, the integrated display module 1200 with the integrated touch sensor module shown in FIG. 12A is joined to a lightguide module 1252 using OCA 1250. As discussed above, the light source 1251 is mounted on flexible printed circuit 1253, which is bonded to the lightguide module 1252. The OCA 1254 is utilized to join a cover lens 1260 to the user side of the lightguide module 1252.

Thus, the display module 1205 illustrated in FIG. 12B integrates a display electronic slurry module including touch functionality with a discrete lightguide module to provide a compact and lightweight display.

Figure 13A:
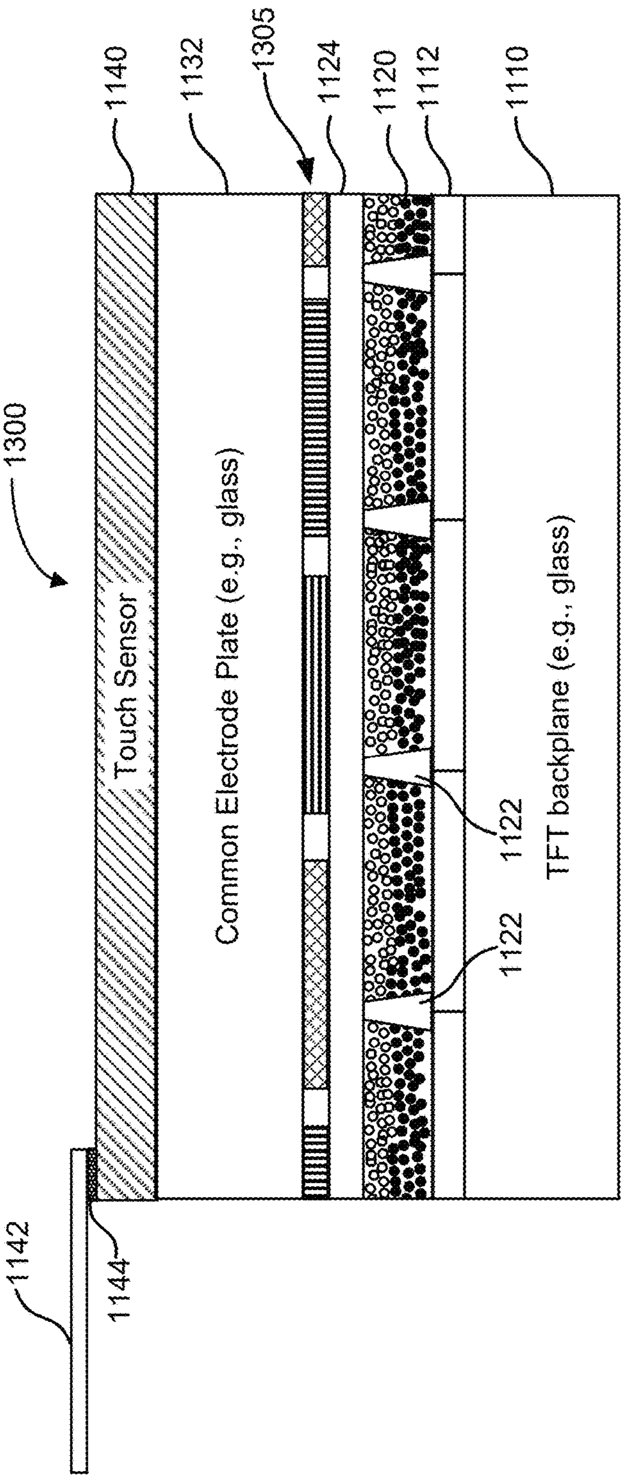
FIG. 13A is a simplified schematic diagram illustrating an integrated color display module including a display electronic slurry module with an integrated touch sensor module according to an embodiment of the present disclosure.

FIG. 13A is a simplified schematic diagram illustrating an integrated color display module 1300 including a display electronic slurry module with an integrated touch sensor module according to an embodiment of the present disclosure. The integrated color display module 1300 illustrated in FIG. 13 shares common elements with the integrated display module 1100 illustrated in FIG. 11 and the discussion provided in relation to the integrated display module 1100 shown in FIG. 11 is applicable to the integrated color display module 1300 shown in FIG. 13 as appropriate.

As discussed in relation to FIG. 11, the touch sensor module 1140, also referred to as a touch sensor, is positioned directly on the user side surface of the common electrode plate 1132 of the display electronic slurry module. As a result, this embodiment can be referred to as a display electronic slurry module with on-cell touch functionality.

Referring to FIG. 13A, a TFT backplane 1110 supports the pixel electrodes 1112 used to drive the display. The common electrode 1124 is formed on the common electrode plate 1132. The ink slurry 1120 is separated by photo spacers 1122 and sandwiched between the common electrode 1124 of the common electrode plate 1132 and the pixel electrodes 1112 of the TFT backplane 1110. The ink slurry 1120, in conjunction with the photo spacers 1122, define pixels that correspond to the pixel electrodes 1112 of the TFT backplane 1110.

The substantially planar, user side surface of the common electrode plate 1132 provides a suitable surface for formation, e.g., deposition, of the components of the touch sensor. In contrast with conventional displays that utilize a separate and distinct touch sensor module, the components of the touch sensor module 1140 are formed directly on the user side surface of the common electrode plate 1132, which also supports the common electrode for the display electronic slurry module. FPC 1142 provides for electrical connectivity to the touch sensor module 1140 and can be bonded to the touch sensor module 1140 using adhesive 1144.

In order to implement a multi-color display, e.g., an RGB display, a color filter array 1305 is inserted between the common electrode 1124 and the common electrode plate 1132. Each of the color filters in the color filter array is aligned with one of the pixels in the ink slurry 1120 defined by the photo spacers 1122. In other embodiments, the color filter array 1305 is inserted at another position in the color display stack as appropriate to the particular application.

Figure 13B:
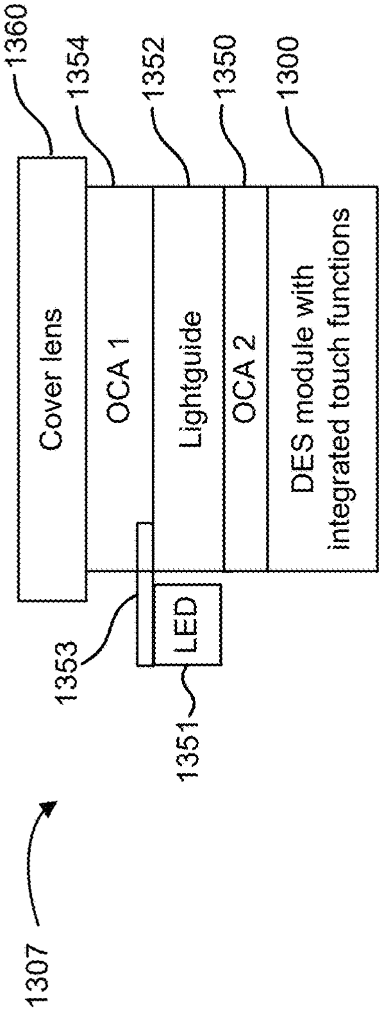
FIG. 13B is a simplified schematic diagram illustrating a color display module with the integrated display module of FIG. 13A according to an embodiment of the present disclosure.

FIG. 13B is a simplified schematic diagram illustrating a color display module 1307 with the integrated color display module 1300 of FIG. 13A according to an embodiment of the present disclosure. In FIG. 13B, a full display stack is illustrated that includes the display electronic slurry module with an integrated touch sensor module joined to a lightguide module using optically clear adhesive layers. Referring to FIG. 13B, the integrated color display module 1300 shown in FIG. 13A is joined to a lightguide module 1352 using the OCA 1350. As discussed above, the light source 1351 is mounted on flexible printed circuit 1353, which is bonded to the lightguide module 1352. The OCA 1354 is utilized to join a cover lens 1360 to the user side of the lightguide module 1352.

Thus, the color display module 1307 illustrated in FIG. 13B integrates a color display electronic slurry module including touch functionality with a discrete lightguide module to provide a compact and lightweight display.

Figure 14A:
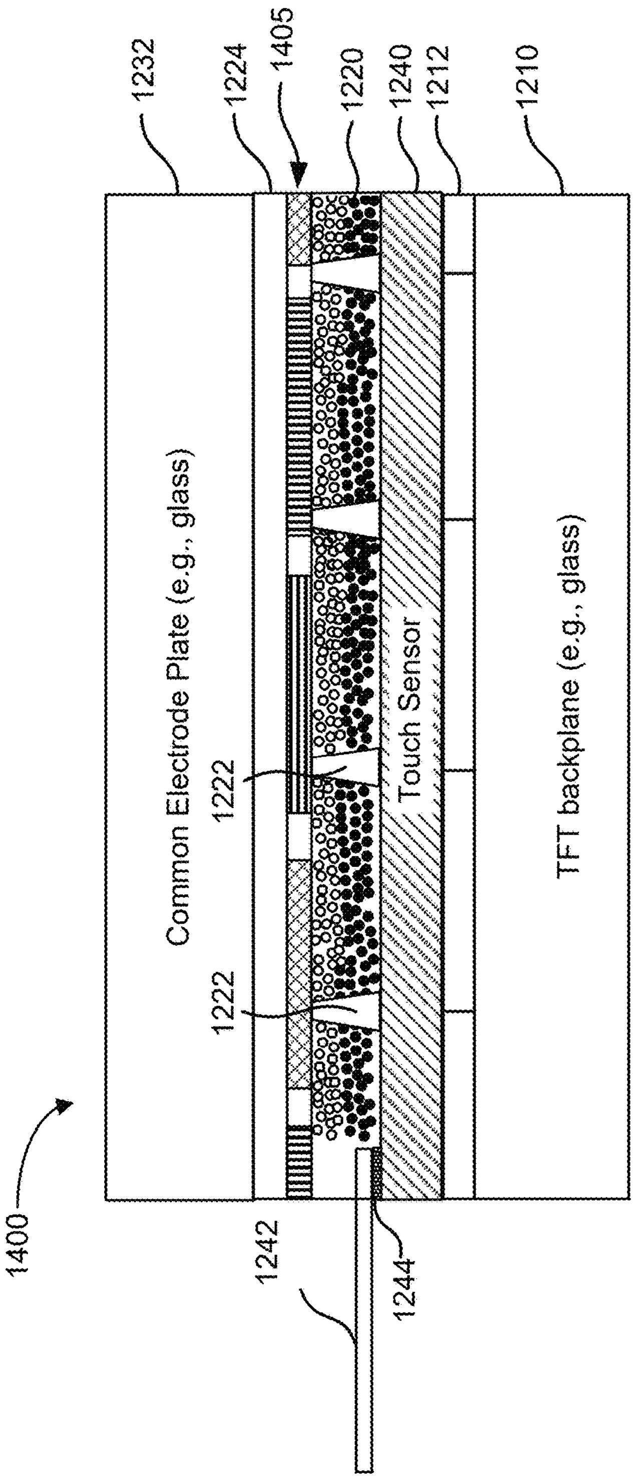
FIG. 14A is a simplified schematic diagram illustrating an integrated color display module including a display electronic slurry module with an integrated touch sensor module according to another embodiment of the present disclosure.

FIG. 14A is a simplified schematic diagram illustrating an integrated color display module including a display electronic slurry module with an integrated touch sensor module according to another embodiment of the present disclosure. The integrated color display module 1400 illustrated in FIG. 14 shares common elements with the integrated display module 1200 illustrated in FIG. 12 and the discussion provided in relation to the integrated display module 1200 shown in FIG. 12 is applicable to the integrated color display module 1400 shown in FIG. 14 as appropriate.

As discussed in relation to FIG. 12A, the touch sensor module 1240, also referred to as a touch sensor, is positioned directly on the thin film transistor structure (i.e., the TFT backplane) opposite the user side surface of the common electrode plate 1232 of the display electronic slurry module. As a result, this embodiment can be referred to as a display electronic slurry module with in-cell touch functionality. Thus, this touch sensor design enables integration of the components of the touch sensor into the TFT circuit design and the components of the touch sensor can be manufactured as part of TFT fabrication process.

Thus, as shown in FIG. 14A, the TFT backplane 1210 supports the pixel electrodes 1212 used to drive the display. The common electrode 1224 is formed on the common electrode plate 1232. The ink slurry 1220 is separated by photo spacers 1222 and sandwiched between the common electrode 1224 of the common electrode plate 1232 and the touch sensor module 1240, which is formed on or in conjunction with the pixel electrodes 1212 of the TFT backplane 1210. The ink slurry 1220 in conjunction with the photo spacers 1222 define pixels that correspond to the pixel electrodes 1212 of the TFT backplane 1210. FPC 1242 provides for electrical connectivity to the touch sensor module 1240 and can be bonded to the touch sensor module 1240 using adhesive 1244.

In order to implement a multi-color display, e.g., an RGB display, a color filter array 1405 is inserted between the ink slurry 1220 and the common electrode 1224 of the common electrode plate 1232. Each of the color filters in the color filter array is aligned with one of the pixels in the ink slurry 1220 defined by the photo spacers 1222. In other embodiments, the color filter array 1405 is inserted at another position in the color display stack as appropriate to the particular application.

Figure 14B:
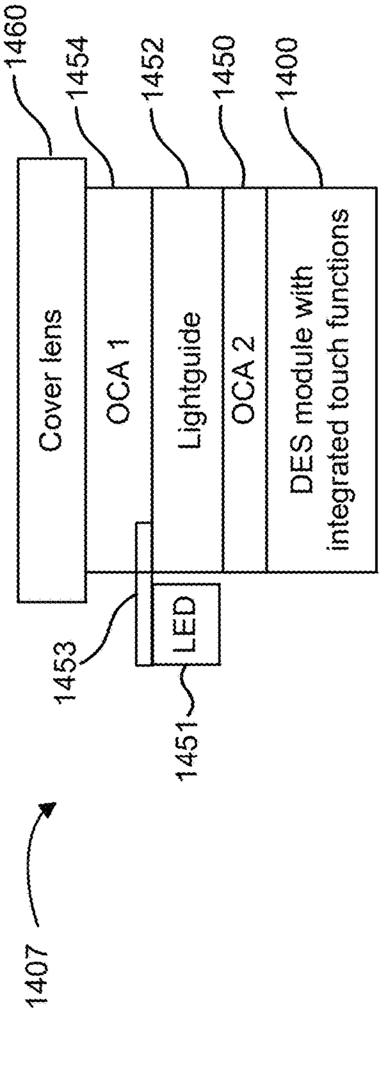
FIG. 14B is a simplified schematic diagram illustrating a color display module with the integrated display module of FIG. 14A according to another embodiment of the present disclosure.

FIG. 14B is a simplified schematic diagram illustrating a color display module 1407 with the integrated color display module 1400 of FIG. 14A according to another embodiment of the present disclosure. In FIG. 14B, a full display stack is illustrated that includes the display electronic slurry module with an integrated touch sensor module joined to a lightguide module using optically clear adhesive layers. Referring to FIG. 14B, the integrated color display module 1400 shown in FIG. 14A is joined to a lightguide module 1452 using the OCA 1450. As discussed above, the light source 1451 is mounted on flexible printed circuit 1453, which is bonded to the lightguide module 1452. The OCA 1454 is utilized to join a cover lens 1460 to the user side of the lightguide module 1452.

Thus, the color display module 1407 illustrated in FIG. 14B integrates a color display electronic slurry module including touch functionality with a discrete lightguide module to provide a compact and lightweight display.

Figure 15:
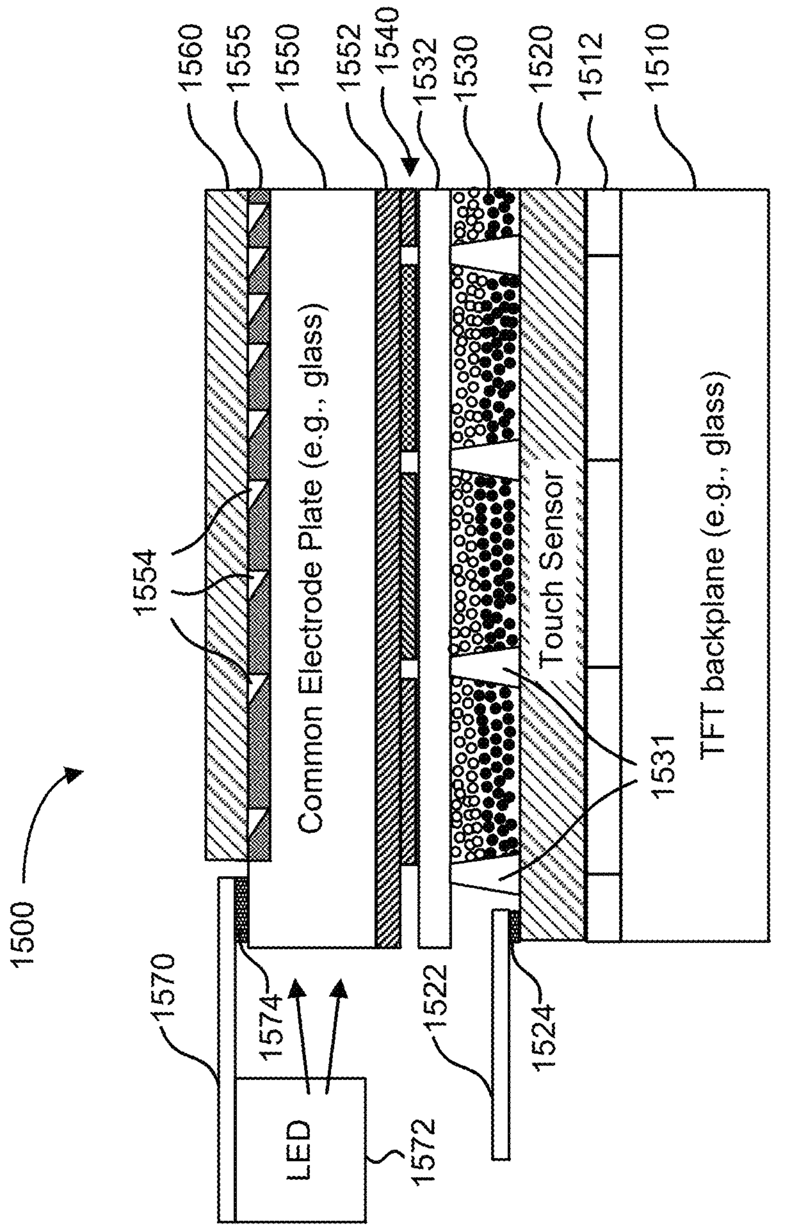
FIG. 15 is a simplified schematic diagram illustrating a color display module with integrated touch and frontlight modules according to an embodiment of the present disclosure.

FIG. 15 is a simplified schematic diagram illustrating a color display module with integrated touch and frontlight modules according to an embodiment of the present disclosure. The color display module 1500 illustrated in FIG. 15 shares common elements with the integrated display module 1200 illustrated in FIG. 12A and the color display electronic slurry module including a common electrode plate lightguide 700 illustrated in FIG. 7 and the discussion provided in relation to the integrated display module 1200 and the color display electronic slurry module including a common electrode plate lightguide 700 is applicable to the color display module 1500 shown in FIG. 15 as appropriate.

Referring to FIG. 15, a TFT backplane 1510 supports the pixel electrodes 1512 used to drive the display. In the embodiment illustrated in FIG. 15, the touch sensor module 1520, also referred to as a touch sensor, is positioned directly on the thin film transistor structure (i.e., the TFT backplane) opposite the user side surface of the common electrode plate 1550 of the display electronic slurry module. FPC 1522 provides for electrical connectivity to the touch sensor module 1520 and can be bonded to the touch sensor module 1520 using adhesive 1524.

The common electrode 1532 is formed, along with the color filter array 1540 and the first coating 1552, on the common electrode plate 1550. The first coating 1552 has an index of refraction that is lower than the index of refraction of the common electrode plate 1550. The optical scattering structure 1554, also referred to as a set of light extraction features, is disposed or embedded in a second optical layer 1555 that has an index of refraction greater than or equal to the index of refraction of the common electrode plate 1550. A second coating 1560 is coupled to the common electrode plate 1550 and the optical scattering structure 1554. The second coating 1560 has an index of refraction that is lower than the index of refraction of the common electrode plate 1550.

In order to generate illumination light for the display, a light source 1572 is mounted on a FPC 1570. The FPC 1570 is bonded to the common electrode plate 1550 using adhesive 1574.

The ink slurry 1530 is separated by photo spacers 1531 and sandwiched between the common electrode 1532 of the common electrode plate 1550 and the touch sensor module 1520, which is formed on or in conjunction with the pixel electrodes 1512 of the TFT backplane 1510. The ink slurry 1530, in conjunction with the photo spacers 1531, define pixels that correspond to the pixel electrodes 1512 of the TFT backplane 1510.

Figure 16:
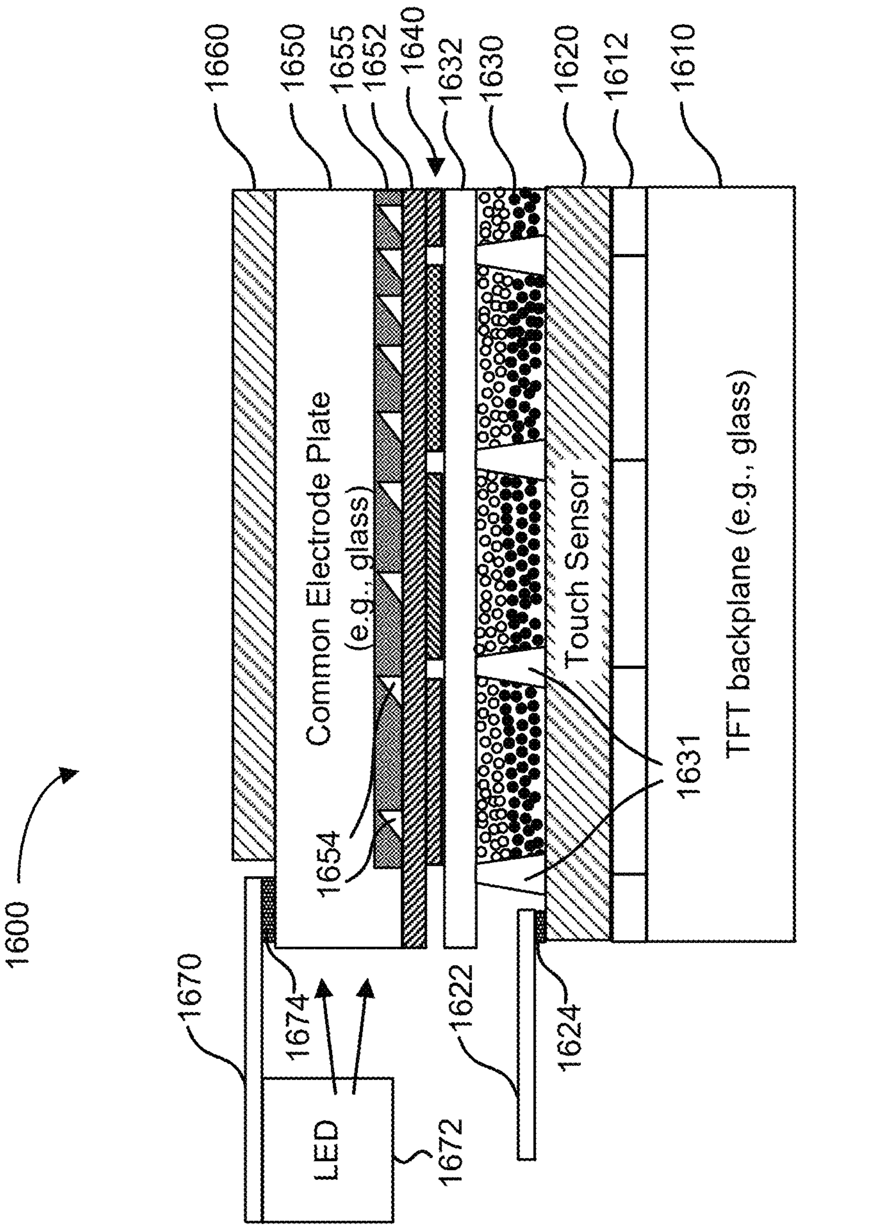
FIG. 16 is a simplified schematic diagram illustrating a color display module with integrated touch and frontlight modules according to another embodiment of the present disclosure.

FIG. 16 is a simplified schematic diagram illustrating a color display module with integrated touch and frontlight modules according to another embodiment of the present disclosure. The color display module 1600 illustrated in FIG. 16 shares common elements with the integrated display module 1200 illustrated in FIG. 12A and the color display electronic slurry module including a common electrode plate lightguide 800 illustrated in FIG. 8 and the discussion provided in relation to the integrated display module 1200 and the color display electronic slurry module including a common electrode plate lightguide 800 is applicable to the color display module 1600 shown in FIG. 16 as appropriate.

Referring to FIG. 16, a TFT backplane 1610 supports the pixel electrodes 1612 used to drive the display. In the embodiment illustrated in FIG. 16, the touch sensor module 1620, also referred to as a touch sensor, is positioned directly on the thin film transistor structure (i.e., the TFT backplane) opposite the user side surface of the common electrode plate 1650 of the display electronic slurry module. FPC 1622 provides for electrical connectivity to the touch sensor module 1620 and can be bonded to the touch sensor module 1620 using adhesive 1624.

The common electrode 1632 is formed, along with the color filter array 1640 and the first coating 1652, on the common electrode plate 1650. The first coating 1652 has an index of refraction that is lower than the index of refraction of the common electrode plate 1650. The optical scattering structure 1654, also referred to as a set of light extraction features, is disposed or embedded in a second optical layer 1655 that has an index of refraction greater than or equal to the index of refraction of the common electrode plate 1650. In this embodiment, the optical scattering structure 1654 is fabricated on the side of the common electrode plate 1650 opposite to the user side of the common electrode plate 1650 and the color display module 1600. A second coating 1660 is coupled to the common electrode plate 1650. The second coating 1660 has an index of refraction that is lower than the index of refraction of the common electrode plate 1650.

In order to generate illumination light for the display, a light source 1672 is mounted on a FPC 1670. The FPC 1670 is bonded to the common electrode plate 1650 using adhesive 1674.

The ink slurry 1630 is separated by photo spacers 1631 and sandwiched between the common electrode 1632 of the common electrode plate 1650 and the touch sensor module 1620, which is formed on or in conjunction with the pixel electrodes 1612 of the TFT backplane 1610. The ink slurry 1630, in conjunction with the photo spacers 1631, define pixels that correspond to the pixel electrodes 1612 of the TFT backplane 1610.

The devices illustrated in FIGS. 15 and 16 incorporate the integrated lightguide structures illustrated in FIGS. 5 and 6, respectively. However, other embodiments can incorporate the integrated lightguide structures illustrated in FIGS. 3 and 4 that embed the optical scattering structure in layer with an index of refraction greater than or equal to the index of refraction of the common electrode plate. Thus, the devices illustrated in FIGS. 15 and 16 are merely illustrative and other embodiments can utilize other integrated lightguide structures as appropriate to the particular application. One of ordinary skill in the art would recognize many variations, modifications, and alternatives.

Figure 17:
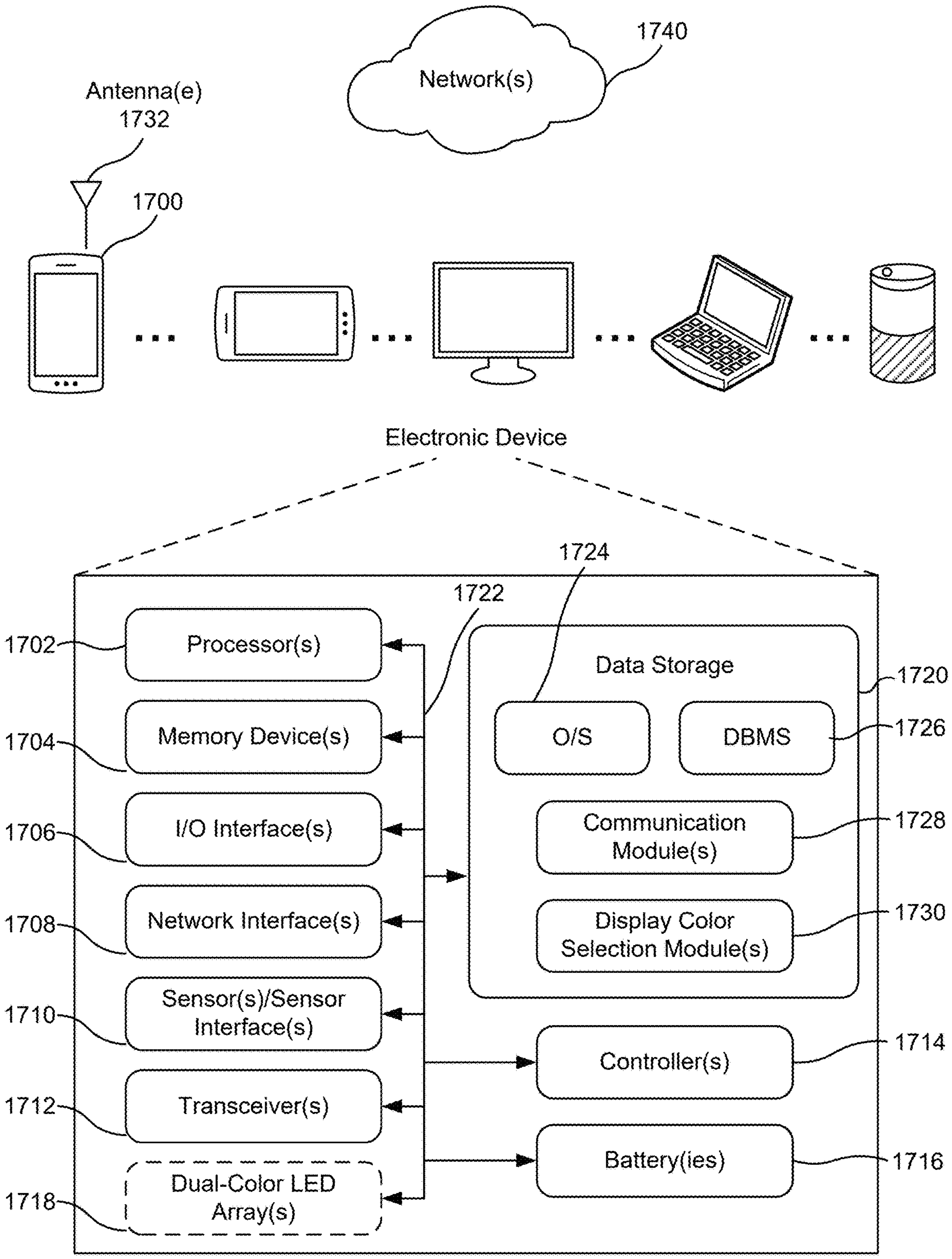
FIG. 17 schematically illustrates an example architecture of an electronic device in accordance with one or more embodiments of the disclosure.

FIG. 17 is a schematic block diagram of one or more illustrative electronic device(s) 1700 in accordance with one or more example embodiments of the disclosure. The electronic device(s) 1700 may include any suitable computing device including, but not limited to, a server system, a camera or camera system, a mobile device such as a smartphone, a tablet, an e-reader, a wearable device, a speaker device, or the like; a desktop computer; a laptop computer; a content streaming device; a set-top box; or the like. The electronic device(s) 1700 may correspond to an illustrative device configuration for the electronic device(s) of FIGS. 1-16.

The electronic device(s) 1700 may be configured to communicate via one or more networks with one or more servers, user devices, or the like. The electronic device(s) 1700 may have a battery that is configured to prevent swelling or other damage, which may prevent damage to the electronic device(s) 1700. The electronic device(s) 1700 may be configured to select one or more wireless communication protocols, and control operations of remote devices, such an internet of things devices, and other operations.

The electronic device(s) 1700 may be configured to communicate via one or more networks 1740. Such network(s) 1740 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) 1740 may have any suitable communication range associated therewith and may include, for example, global networks (e.g., the Internet), metropolitan area networks (MANs), wide area networks (WANs), local area networks (LANs), or personal area networks (PANs). In addition, such network(s) 1740 may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the electronic device(s) 1700 may include one or more processors (processor(s)) 1702, one or more memory devices 1704 (generically referred to in this section as memory 1704), one or more input/output (I/O) interfaces 1706, one or more network interfaces 1708, one or more sensors or sensor interfaces 1710, one or more transceivers 1712, one or more controllers 1714, one or more batteries 1716, one or more optional dual-color LED array(s) 1718, and data storage 1720. The electronic device(s) 1700 may further include one or more buses 1722 that functionally couple various components of the electronic device(s) 1700. The electronic device(s) 1700 may optionally include one or more antenna (e) 1732 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, an RFID antenna, and so forth.

The bus(es) 1722 may include at least one of a system bus, a memory bus, an address bus, or a message bus, and may permit the exchange of information (e.g., data (including computer-executable code), signaling, etc.) between various components of the electronic device(s) 1700. The bus(es) 1722 may include, without limitation, a memory bus or a memory controller, a peripheral bus, an accelerated graphics port, and so forth. The bus(es) 1722 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1704 of the electronic device(s) 1700 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1704 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1704 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1720 may include removable storage and/or non-removable storage including, but not limited to, magnetic storage, optical disk storage, and/or tape storage. The data storage 1720 may provide non-volatile storage of computer-executable instructions and other data. The memory 1704 and the data storage 1720, removable and/or non-removable, are examples of computer-readable storage media (CRSM) as that term is used herein.

The data storage 1720 may store computer-executable code, instructions, or the like that may be loadable into the memory 1704 and executable by the processor(s) 1702 to cause the processor(s) 1702 to perform or initiate various operations. The data storage 1720 may additionally store data that may be copied to the memory 1704 for use by the processor(s) 1702 during the execution of the computer-executable instructions. Moreover, output data generated as a result of execution of the computer-executable instructions by the processor(s) 1702 may be stored initially in the memory 1704, and may ultimately be copied to the data storage 1720 for non-volatile storage.

More specifically, the data storage 1720 may store one or more operating systems (O/S) 1724; one or more database management systems (DBMS) 1726; and one or more program module(s), applications, engines, computer-executable code, scripts, or the like such as, for example, one or more communication module(s) 1728 and/or one or more display color selection module(s) 1730. Some or all of these module(s) may be or include sub-module(s). Any of the components depicted as being stored in data storage 1720 may include any combination of software, firmware, and/or hardware. The software and/or firmware may include computer-executable code, instructions, or the like that may be loaded into the memory 1704 for execution by one or more of the processor(s) 1702. Any of the components depicted as being stored in data storage 1720 may support the functionality described in reference to the corresponding components named earlier in this disclosure.

The data storage 1720 may further store various types of data utilized by the components of the electronic device(s) 1700. Any data stored in the data storage 1720 may be loaded into the memory 1704 for use by the processor(s) 1702 in executing computer-executable code. In addition, any data depicted as being stored in the data storage 1720 may potentially be stored in one or more datastore(s) and may be accessed via the DBMS 1726 and loaded in the memory 1704 for use by the processor(s) 1702 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 17, an example datastore(s) may include, for example, user account or user profile data, user device or battery settings, user device preferences and authorizations, and other information.

The processor(s) 1702 may be configured to access the memory 1704 and execute the computer-executable instructions loaded therein. For example, the processor(s) 1702 may be configured to execute computer-executable instructions of the various program module(s), applications, engines, or the like of the electronic device(s) 1700 to cause or facilitate various operations to be performed in accordance with one or more embodiments of the disclosure. The processor(s) 1702 may include any suitable processing unit capable of accepting data as input, processing the input data in accordance with stored computer-executable instructions, and generating output data. The processor(s) 1702 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an Image Signal Processor (ISP), a digital signal processor (DSP), and so forth. Further, the processor(s) 1702 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1702 may be capable of supporting any of a variety of instruction sets.

Referring now to functionality supported by the various program module(s) depicted in FIG. 17, the communication module(s) 1728 may include computer-executable instructions, code, or the like that responsive to execution by one or more of the processor(s) 1702 may perform functions including, but not limited to, communicating with remote servers or devices, communicating with remote datastores, communicating with local servers or devices on an intranet, sending or receiving information and instructions, sending or receiving orders, and the like.

The display color selection module(s) 1730 may include computer-executable instructions, code, or the like that responsive to execution by one or more of the processor(s) 1702 may perform functions including, but not limited to, determining an LED color to activate, determining one or more LED colors to use, controlling operation of one or more LEDs or LED arrays, controlling display components or driving circuits, and the like.

Referring now to other illustrative components depicted as being stored in the data storage 1720, the 0/S 1724 may be loaded from the data storage 1720 into the memory 1704 and may provide an interface between other application software executing on the electronic device(s) 1700 and the hardware resources of the electronic device(s) 1700. More specifically, the 0/S 1724 may include a set of computer-executable instructions for managing the hardware resources of the electronic device(s) 1700 and for providing common services to other application programs (e.g., managing memory allocation among various application programs). In certain example embodiments, the 0/S 1724 may control execution of the other program module(s) to dynamically enhance characters for content rendering. The O/S 1724 may include any operating system now known or which may be developed in the future including, but not limited to, any server operating system, any mainframe operating system, or any other proprietary or non-proprietary operating system.

The DBMS 1726 may be loaded into the memory 1704 and may support functionality for accessing, retrieving, storing, and/or manipulating data stored in the memory 1704 and/or data stored in the data storage 1720. The DBMS 1726 may use any of a variety of database models (e.g., relational model, object model, etc.) and may support any of a variety of query languages. The DBMS 1726 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the electronic device(s) 1700 is a mobile device, the DBMS 1726 may be any suitable light-weight DBMS optimized for performance on a mobile device.

Referring now to other illustrative components of the electronic device(s) 1700, the input/output (I/O) interface(s) 1706 may facilitate the receipt of input information by the electronic device(s) 1700 from one or more I/O devices as well as the output of information from the electronic device(s) 1700 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the electronic device(s) 1700 or may be separate. The I/O devices may further include, for example, any number of peripheral devices such as data storage devices, printing devices, and so forth.

The I/O interface(s) 1706 may also include an interface for an external peripheral device connection such as universal serial bus (USB), micro-USB, Fire Wire, Thunderbolt, Ethernet port or other connection protocol that may connect to one or more networks. The I/O interface(s) 1706 may also include a connection to one or more of the antenna (e) 1732 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, a WiMAX network, a 3G network, a ZigBee network, etc.

The electronic device(s) 1700 may further include one or more network interface(s) 1708 via which the electronic device(s) 1700 may communicate with any of a variety of other systems, platforms, networks, devices, and so forth. The network interface(s) 1708 may enable communication, for example, with one or more wireless routers, one or more host servers, one or more web servers, and the like via one or more networks.

The optional antenna (e) 1732 may include any suitable type of antenna depending, for example, on the communications protocols used to transmit or receive signals via the antenna (e) 1732. Non-limiting examples of suitable antennae may include directional antennae, non-directional antennae, dipole antennae, folded dipole antennae, patch antennae, multiple-input multiple-output (MIMO) antennae, or the like. The antenna (e) 1732 may be communicatively coupled to one or more transceivers 1712 or radio components to which or from which signals may be transmitted or received.

As previously described, the antenna (e) 1732 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 1732 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna (e) 1732 may be configured to transmit or receive radio frequency signals within any suitable frequency range forming part of the unlicensed portion of the radio spectrum.

The antenna (e) 1732 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1712 may include any suitable radio component(s) for—in cooperation with the antenna (e) 1732—transmitting or receiving radio frequency (RF) signals in the bandwidth and/or channels corresponding to the communications protocols utilized by the electronic device(s) 1700 to communicate with other devices. The transceiver(s) 1712 may include hardware, software, and/or firmware for modulating, transmitting, or receiving—potentially in cooperation with any of antenna (e) 1732—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1712 may further include hardware, firmware, or software for receiving GNSS signals. The transceiver(s) 1712 may include any known receiver and baseband suitable for communicating via the communications protocols utilized by the electronic device(s) 1700. The transceiver(s) 1712 may further include a low noise amplifier (LNA), additional power signal amplifiers (PA), an analog-to-digital (A/D) converter, one or more buffers, a digital baseband, or the like.

The controller(s) 1714 may be any microcontroller or microprocessor configured to control one or more operations of the electronic device(s) 1700. The battery(ies) 1716 may be a swelling resistant pouch battery configured to power the electronic device(s) 1700. For example, the battery 1716 may be a lithium-ion battery. The battery 1716 may be coupled to the one or more optional dual-color LED array(s) 1718. The one or more optional dual-color LED array(s) 1718 may include one or more LED colors, such as amber colored LEDs, cool white LEDs, and other LED colors, and may include LEDs having a specific arrangement, such as an alternating arrangement, a separated arrangement, or another arrangement.

The sensor(s)/sensor interface(s) 1710 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

It should be appreciated that the program module(s), applications, computer-executable instructions, code, or the like depicted in FIG. 17 as being stored in the data storage 1720 are merely illustrative and not exhaustive and that the processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the electronic device(s) 1700, and/or hosted on other computing device(s) accessible via one or more networks, may be provided to support the functionality provided by the program module(s), applications, or computer-executable code depicted in FIG. 17 and/or additional or alternate functionality. Further, functionality may be modularized differently such that processing described as being supported collectively by the collection of program module(s) depicted in FIG. 17 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 17 may be implemented, at least partially, in hardware and/or firmware across any number of devices.

It should further be appreciated that the electronic device(s) 1700 may include alternate and/or additional hardware, software, or firmware components beyond those described or depicted without departing from the scope of the disclosure. More particularly, it should be appreciated that software, firmware, or hardware components depicted as forming part of the electronic device(s) 1700 are merely illustrative and that some components may not be present or additional components may be provided in various embodiments. While various illustrative program module(s) have been depicted and described as software module(s) stored in the data storage 1720, it should be appreciated that the functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, schematics, and use cases of FIGS. 1-16 may be performed by a device having the illustrative configuration depicted in FIG. 17, or more specifically, by one or more engines, program module(s), applications, or the like executable on such a device. It should be appreciated, however, that such operations may be implemented in connection with numerous other device configurations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A device comprising:
- a thin film transistor structure including a plurality of pixel electrodes;
- a display unit coupled to the thin film transistor structure and comprising:
  - a common electrode;
  - a coating coupled to the common electrode and characterized by a first index of refraction;
  - an optical layer coupled to the coating and characterized by a second index of refraction greater than the first index of refraction;
  - an optical scattering structure coupled to the optical layer;
  - a light source optically coupled to the optical layer; and
- a touch sensitive module coupled to the display unit.

2. The device of claim 1 further comprising a pixelated electronic slurry structure disposed between the thin film transistor structure and the common electrode.

3. The device of claim 1 wherein the optical layer comprises an edge and the light source comprises a light emitting diode configured to emit light in a plane passing through the edge of the optical layer.

4. The device of claim 1 further comprising a second optical layer coupled to the optical layer.

5. The device of claim 4 wherein the optical scattering structure is disposed in the second optical layer.

6. The device of claim 4 wherein the second optical layer is characterized by the second index of refraction.

7. The device of claim 1 further comprising a second optical coating coupled to the optical layer and characterized by the first index of refraction.

8. The device of claim 1 wherein the optical scattering structure comprises a diffractive structure.

9. The device of claim 8 wherein the diffractive structure is characterized by a varying diffraction efficiency as a function of distance from the light source.

10. The device of claim 1 further comprising:
- an optical adhesive coupled to the touch sensitive module; and
- a cover lens coupled to the optical adhesive.

11. The device of claim 1 wherein the common electrode is in electrical communication with the pixel electrodes of the thin film transistor structure.

12. A device comprising:
- a thin film transistor structure including a plurality of pixel electrodes;
- a pixelated electronic slurry structure coupled to the thin film transistor structure;
- a common electrode coupled to the pixelated electronic slurry structure;
- a coating coupled to the common electrode and characterized by a first index of refraction;
- an optical layer coupled to the coating, having an edge, and characterized by a second index of refraction greater than the first index of refraction;
- a second optical layer coupled to the optical layer, wherein the second optical layer has a third index of refraction greater than or equal to the second index of refraction;
- an optical scattering structure disposed in the second optical layer; and
- a light source optically coupled to the edge of the optical layer.

13. The device of claim 12 wherein the third index of refraction is greater than the second index of refraction.

14. The device of claim 12 further comprising a pixelated electronic slurry structure disposed between the thin film transistor structure and the common electrode.

15. The device of claim 12 further comprising a second optical coating coupled to the optical layer and characterized by the first index of refraction.

16. The device of claim 12 further comprising a color filter array disposed between the common electrode and the coating.

17. A device comprising:
- a thin film transistor structure including a plurality of pixel electrodes;
- a pixelated electronic slurry structure coupled to the thin film transistor structure;
- a common electrode coupled to the pixelated electronic slurry structure;
- a coating coupled to the common electrode and characterized by a first index of refraction;
- an optical layer coupled to the coating, having an edge, and characterized by a second index of refraction greater than the first index of refraction;
- an optical scattering structure disposed in the optical layer;
- a light source optically coupled to the edge of the optical layer; and
- a second optical layer coupled to the optical layer and the optical scattering structure, wherein the second optical layer is characterized by the first index of refraction.

18. The device of claim 17 further comprising a pixelated electronic slurry structure disposed between the thin film transistor structure and the coating.

19. The device of claim 17 wherein the optical layer comprises an edge and the light source comprises a light emitting diode configured to emit light in a plane passing through the edge of the optical layer.

20. The device of claim 17 further comprising:

a touch sensitive module coupled to the second optical layer;

an optical adhesive coupled to the touch sensitive module; and a cover lens coupled to the optical adhesive.

* * * * *